United States Patent
Takada

(10) Patent No.: US 10,309,783 B2
(45) Date of Patent: Jun. 4, 2019

(54) PHYSICAL QUANTITY DETECTION SYSTEM, ELECTRONIC APPARATUS, AND MOVING OBJECT

(71) Applicant: Seiko Epson Corporation, Tokyo (JP)

(72) Inventor: Yutaka Takada, Minamiminowa (JP)

(73) Assignee: Seiko Epson Corporation (JP)

( * ) Notice: Subject to any disclaimer, the term of this patent is extended or adjusted under 35 U.S.C. 154(b) by 361 days.

(21) Appl. No.: 15/255,520

(22) Filed: Sep. 2, 2016

(65) Prior Publication Data

US 2017/0067931 A1    Mar. 9, 2017

(30) Foreign Application Priority Data

Sep. 9, 2015  (JP) ................................ 2015-177415

(51) Int. Cl.
  *G01C 19/5712*   (2012.01)
  *G01C 19/5776*   (2012.01)

(52) U.S. Cl.
  CPC ..... *G01C 19/5776* (2013.01); *G01C 19/5712* (2013.01)

(58) Field of Classification Search
  CPC ............ G01C 19/5776; G01C 19/5712; G01C 19/5747; G01C 19/5607; G01C 19/5628; G01P 15/18
  See application file for complete search history.

(56) References Cited

U.S. PATENT DOCUMENTS

| | | | | |
|---|---|---|---|---|
| 5,270,972 A * | 12/1993 | Craig | ....................... | G11C 5/14 365/189.03 |
| 6,160,959 A | 12/2000 | Mizumoto | | |
| 6,324,482 B1 * | 11/2001 | Nakagaki | ............... | G01D 3/022 702/104 |
| 8,346,494 B2 * | 1/2013 | Niwa | ..................... | G01D 3/022 702/104 |
| 9,735,564 B1 * | 8/2017 | Coq | ........................ | H02H 3/42 |
| 2006/0044048 A1 * | 3/2006 | Nagase | .................. | G01D 3/022 327/513 |
| 2013/0263660 A1 | 10/2013 | Shibata | | |

FOREIGN PATENT DOCUMENTS

| | | |
|---|---|---|
| JP | 11-311817 A | 11/1999 |
| JP | 2013-217813 A | 10/2013 |

\* cited by examiner

*Primary Examiner* — Helen C Kwok
(74) *Attorney, Agent, or Firm* — Harness, Dickey & Pierce, P.L.C.

(57) ABSTRACT

A physical quantity detection system includes first and second physical quantity sensors, first and second power supply lines to which a power supply voltage is applied, a first decoupling circuit with first band elimination frequency characteristics, and a second decoupling circuit with second band elimination frequency characteristics. A relationship of a cutoff frequency on a low frequency side of the first band elimination frequency characteristics<a first drive frequency of a first drive circuit<a cutoff frequency on a high frequency side of the first band elimination frequency characteristics is satisfied, and a relationship of a cutoff frequency on a low frequency side of the second band elimination frequency characteristics<a second drive frequency of a second drive circuit<a cutoff frequency on a high frequency side of second band elimination frequency characteristics is satisfied.

20 Claims, 17 Drawing Sheets

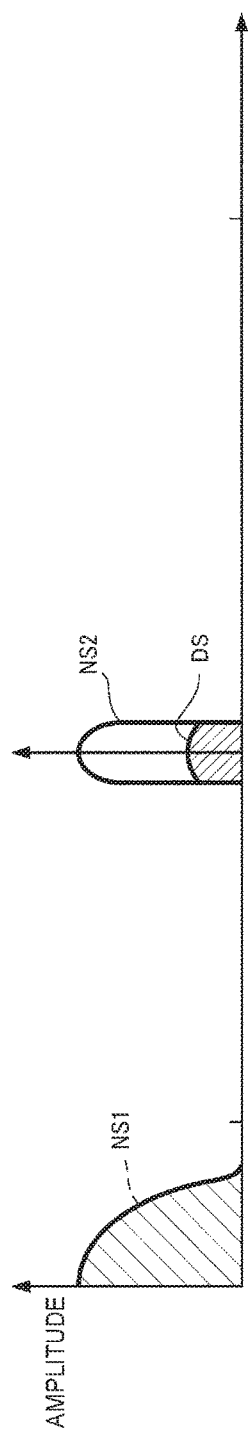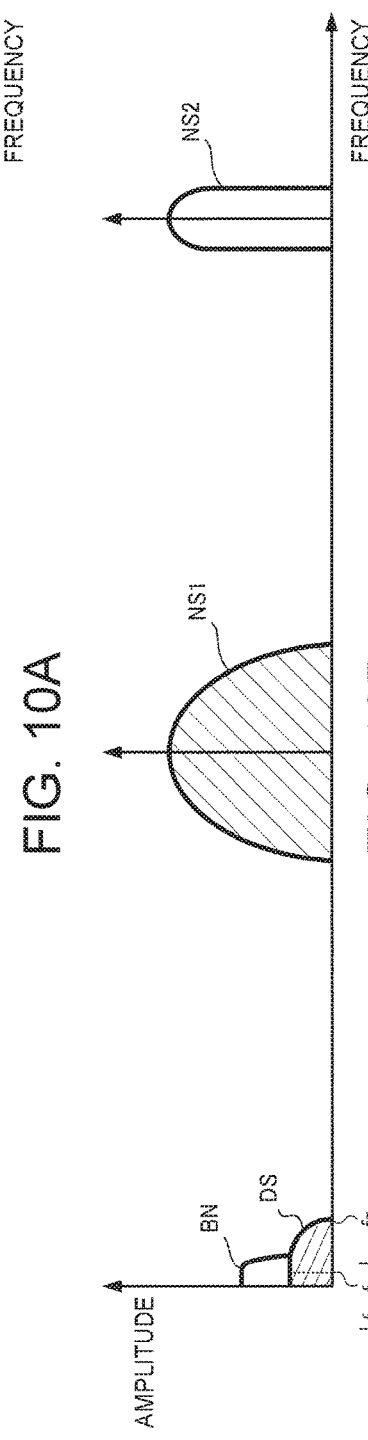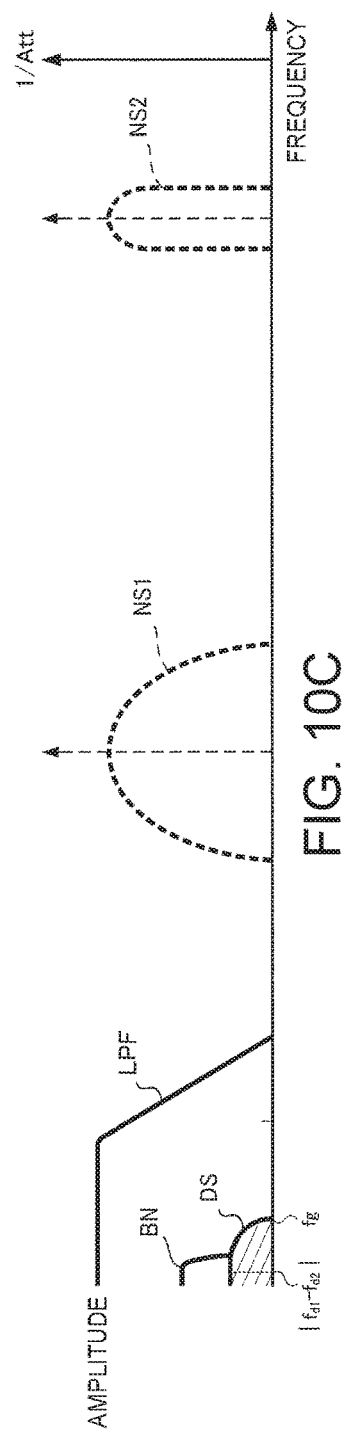

FIG. 11A
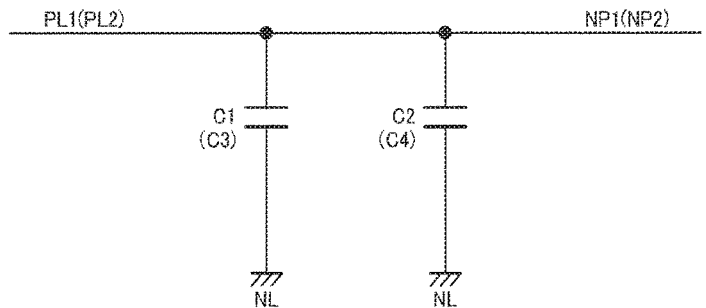
FIG. 11B
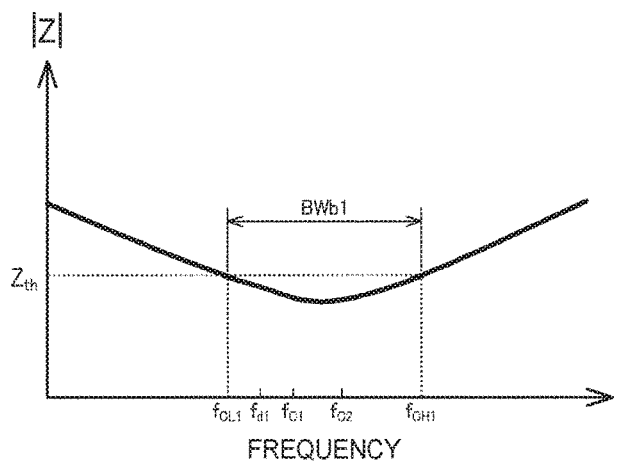
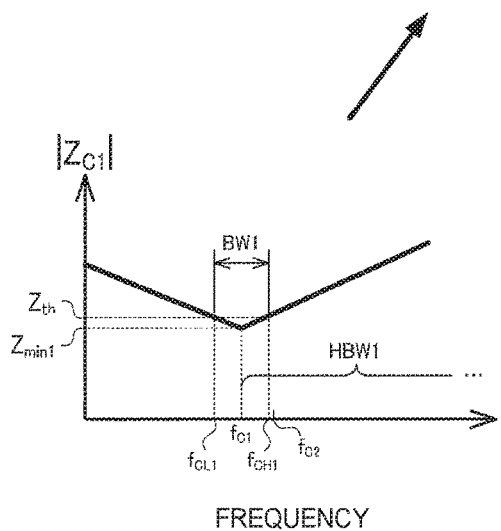
FIG. 11C
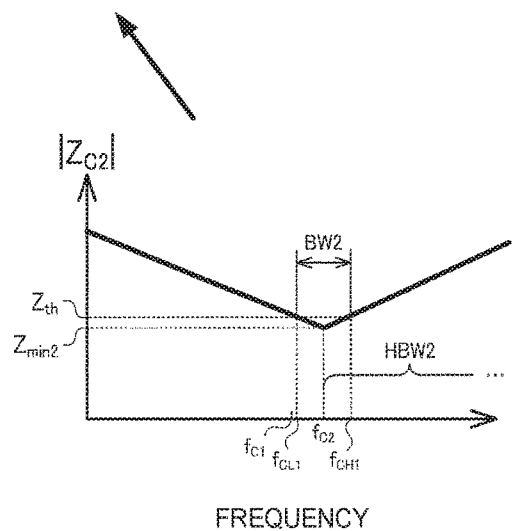
FIG. 11D

PHYSICAL QUANTITY DETECTION SYSTEM, ELECTRONIC APPARATUS, AND MOVING OBJECT

BACKGROUND

1. Technical Field

The present invention relates to a physical quantity detection system, an electronic apparatus, and a moving object.

2. Related Art

A physical quantity detection system which detects a physical quantity such as an angular rate or an acceleration speed is used for, for example, control of a car body, host vehicle position detection of a car navigation system, vibration control correction (so-called image stabilization) of a digital camera, a video camera, or the like, and the like in a vehicle. A device which includes multiple physical quantity sensors (physical quantity transducers) and detects an angular rate around two or three detection axes orthogonal to each other is known as a sensor device including the physical quantity detection system, as disclosed in, for example, JP-A-2013-217813.

As described in JP-A-2013-217813, in a case where a physical quantity is detected by driving multiple physical quantity transducers using one power supply, there is a possibility that, for example, noise of drive frequency components of a first physical quantity transducer is transferred to a detection circuit of a second physical quantity transducer through a power supply line from a drive circuit. In this case, if a first drive frequency of the first physical quantity transducer is referred to as $f_{d1}$ and a second drive frequency of the second physical quantity transducer is referred to as $f_{d2}$, beat noise of a frequency corresponding to a difference between $f_{d1}$ and $f_{d2}$ is generated and an error occurs in a physical quantity which is detected.

SUMMARY

An advantage of some aspects of the invention is to provide a physical quantity detection system, an electronic apparatus, and a moving object which can prevent beat noise from being generated in a case where multiple physical quantity sensors are driven by using a common power supply.

One aspect of the invention relates to a physical quantity detection system including: a first physical quantity sensor that includes a first physical quantity transducer, a first drive circuit which drives the first physical quantity transducer, and a first detection circuit which outputs first physical quantity information corresponding to a first physical quantity, based on a first detection signal which is outputted from the first physical quantity transducer; a second physical quantity sensor that includes a second physical quantity transducer, a second drive circuit which drives the second physical quantity transducer, and a second detection circuit which outputs second physical quantity information corresponding to a second physical quantity, based on a second detection signal which is outputted from the second physical quantity transducer; a first power supply line to which a power supply voltage that is supplied to the first physical quantity sensor from a common power supply of the first physical quantity sensor and the second physical quantity sensor is applied; a second power supply line to which the power supply voltage that is supplied to the second physical quantity sensor from the power supply is applied; a first decoupling circuit which is connected to a path of the first power supply line and has first band elimination frequency characteristics; and a second decoupling circuit which is connected to a path of the second power supply line and has second band elimination frequency characteristics, in which, in a case where a first drive frequency of the first drive circuit is referred to as $f_{d1}$, a second drive frequency of the second drive circuit is referred to as $f_{d2}$, a cutoff frequency on a low frequency side of the first band elimination frequency characteristics is referred to as $f_{CL1}$, a cutoff frequency on a low frequency side of the second band elimination frequency characteristics is referred to as $f_{CL2}$, a cutoff frequency on a high frequency side of the first band elimination frequency characteristics is referred to as $f_{CH1}$, and a cutoff frequency on a high frequency side of the second band elimination frequency characteristics is referred to as $f_{CH2}$, a relationship of $f_{CL1}<f_{d1}<f_{CH1}$ is satisfied and a relationship of $f_{CL2}<f_{d2}<f_{CH2}$ is satisfied.

The physical quantity detection system according to the aspect employs the first decoupling circuit with first band elimination frequency characteristics in the relationship of $f_{CL1}<f_{d1}<f_{CH1}$ and the second decoupling circuit with second band elimination frequency characteristics in a relationship of $f_{CL2}<f_{d2}<f_{CH2}$. In addition, components of the first drive frequency $f_{d1}$ of the first physical quantity sensor are reduced by the first decoupling circuit, components of the second drive frequency $f_{d2}$ of the second physical quantity sensor are reduced by the second decoupling circuit, and drive frequency components of the other physical quantity sensor which are inputted to one physical quantity sensor are reduced. Hence, in a case where multiple physical quantity sensors are driven by using a common power supply, it is possible to prevent beat noise from being generated.

In one aspect of the invention, a relationship of $f_{CL1}<f_{d1}<3\times f_{d1}<f_{CH1}$ may be satisfied and a relationship of $f_{CL2}<f_{d2}<3\times f_{d2}<f_{CH2}$ may be satisfied.

With this configuration, it is possible to reduce components of harmonics of a drive frequency of one physical quantity sensor, and to prevent the other physical quantity sensor from being adversely affected by the components of harmonics.

In one aspect of the invention, a relationship of $f_{CL1}<f_{d1}<3\times f_{d1}<5\times f_{d1}<7\times f_{d1}<f_{CH1}$ may be satisfied and a relationship of $f_{CL2}<f_{d2}<3\times f_{d2}<5\times f_{d2}<7\times f_{d2}<f_{CH2}$ may be satisfied.

With this configuration, it is possible to reduce components of higher harmonics of a drive frequency of one physical quantity sensor, and to prevent the other physical quantity sensor from being adversely affected by the components of the harmonics.

In one aspect of the invention, the first drive circuit and the second drive circuit may drive the first physical quantity transducer and the second physical quantity transducer using drive signals of a rectangular wave.

With this configuration, if a rectangular wave drive is performed, the physical quantity sensor is adversely affected by components of harmonics, but it is possible to reduce the adverse affection.

In one aspect of the invention, in a case where an upper side frequency of a detection frequency band of the first physical quantity information and the second physical quantity information is referred to as $f_g$, a relationship of $|f_{d1}-f_{d2}|<f_g$ may be satisfied.

With this configuration, even in a case where a relationship of $|f_{d1}-f_{d2}|<f_g$ is satisfied and beat noise is unable to be removed by filter processing after synchronization detection is completed, it is possible to acquire correct physical quantity information.

In one aspect of the invention, a third power supply line which applies the power supply voltage to the first power supply line and the second power supply line and a third decoupling circuit which is connected to a path of the third power supply line may be further included.

With this configuration, even in a case where external noise frequency components in a frequency band of the first drive frequency $f_{d1}$ or a frequency band of the second drive frequency $f_{d2}$ are inputted, it is possible to prevent beat noise from being generated.

In one aspect of the invention, the first decoupling circuit may include a first capacitor, and a second capacitor having a capacitance value different from a capacitance value of the first capacitor, the second decoupling circuit may include a third capacitor, and a fourth capacitor having a capacitance value different from a capacitance value of the third capacitor, the first capacitor and the second capacitor may be provided between the first power supply line which supplies the power on a high potential side and a power supply node on a low potential side, and the third capacitor and the fourth capacitor may be provided between the second power supply line which supplies the power on the high potential side and a power supply node on the low potential side.

With this configuration, it is possible to prevent drive frequency components from being inputted to the other physical quantity sensor and a power supply line by bypassing the drive frequency components to the ground.

In one aspect of the invention, the first decoupling circuit may include a first inductor, a first capacitor, and a second capacitor having a capacitance value different from a capacitance value of the first capacitor, the second decoupling circuit may include a second inductor, a third capacitor, and a fourth capacitor having a capacitance value different from a capacitance value of the third capacitor, the first capacitor and the second capacitor may be provided between a first power supplying node which supplies the power to the first physical quantity sensor and a power supply node on a low potential side, the first inductor may be provided between the first power supply line and the first power supplying node, the third capacitor and the fourth capacitor may be provided between a second power supplying node which supplies the power to the second physical quantity sensor and a power supply node on the low potential side, and the second inductor may be provided between the second power supply line and the second power supplying node.

With this configuration, it is possible to prevent not only drive frequency components but also high frequency components of drive frequency from being inputted to the other physical quantity sensor and a power supply line by widening a cutoff frequency bandwidth.

In one aspect of the invention, the first decoupling circuit may include a first inductor, a second inductor, a first capacitor, and a second capacitor having a capacitance value different from a capacitance value of the first capacitor, the second decoupling circuit may include a third inductor, a fourth inductor, a third capacitor, and a fourth capacitor having a capacitance value different from a capacitance value of the third capacitor, the first capacitor and the second capacitor may be provided between a first node and a power supply node on a low potential side, the first inductor may be provided between the first power supply line and the first node, the second inductor may be provided between the first node and a first power supplying node which supplies the power to the first physical quantity sensor, the third capacitor and the fourth capacitor may be provided between a second node and a power supply node on the low potential side, the third inductor may be provided between the second power supply line and the second node, and the fourth inductor may be provided between the second node and a second power supplying node which supplies the power to the second physical quantity sensor.

With this configuration, it is possible to prevent not only drive frequency components but also high frequency components of drive frequency from being inputted to the other physical quantity sensor and a power supply line by further widening a cutoff frequency bandwidth.

In one aspect of the invention, the first physical quantity information and the second physical quantity information may be angular rate information.

With this configuration, it is possible to detect angular rate information around at least two rotation axes.

Another aspect of the invention relates to a physical quantity detection system including: a first physical quantity sensor that includes a first physical quantity transducer, a first drive circuit which drives the first physical quantity transducer, and a first detection circuit which outputs first physical quantity information corresponding to a first physical quantity, based on a first detection signal which is outputted from the first physical quantity transducer; a second physical quantity sensor that includes a second physical quantity transducer, a second drive circuit which drives the second physical quantity transducer, and a second detection circuit which outputs second physical quantity information corresponding to a second physical quantity, based on a second detection signal which is outputted from the second physical quantity transducer; a first power supply line to which a power supply voltage that is supplied to the first physical quantity sensor from a common power supply of the first physical quantity sensor and the second physical quantity sensor is applied; a second power supply line to which the power supply voltage that is supplied to the second physical quantity sensor from the power supply is applied; a third power supply line which applies the power supply voltage to the first power supply line and the second power supply line; a first decoupling circuit which is connected to a path of the first power supply line; a second decoupling circuit which is connected to a path of the second power supply line; and a third decoupling circuit which is connected to a path of the third power supply line.

Still another aspect of the invention relates to an electronic apparatus including the physical quantity detection system.

Yet another aspect of the invention relates to a moving object including the physical quantity detection system.

BRIEF DESCRIPTION OF THE DRAWINGS

The invention will be described with reference to the accompanying drawings, wherein like numbers reference like elements.

FIGS. 10A to 10C are explanatory diagrams of the output signal of the sensor and the beat noise.

FIGS. 11A to 11D are specific configuration examples of the decoupling circuit.

DESCRIPTION OF EXEMPLARY EMBODIMENTS

Hereinafter, the present embodiment will be described. The present embodiment which will be described hereinafter does not unduly limits the content of the invention described in the scope of aspects. In addition, the entire configurations which will be described according to the present embodiment are not limited to essential configuration requirements of the invention.

1. System Configuration Example

Figure 1:
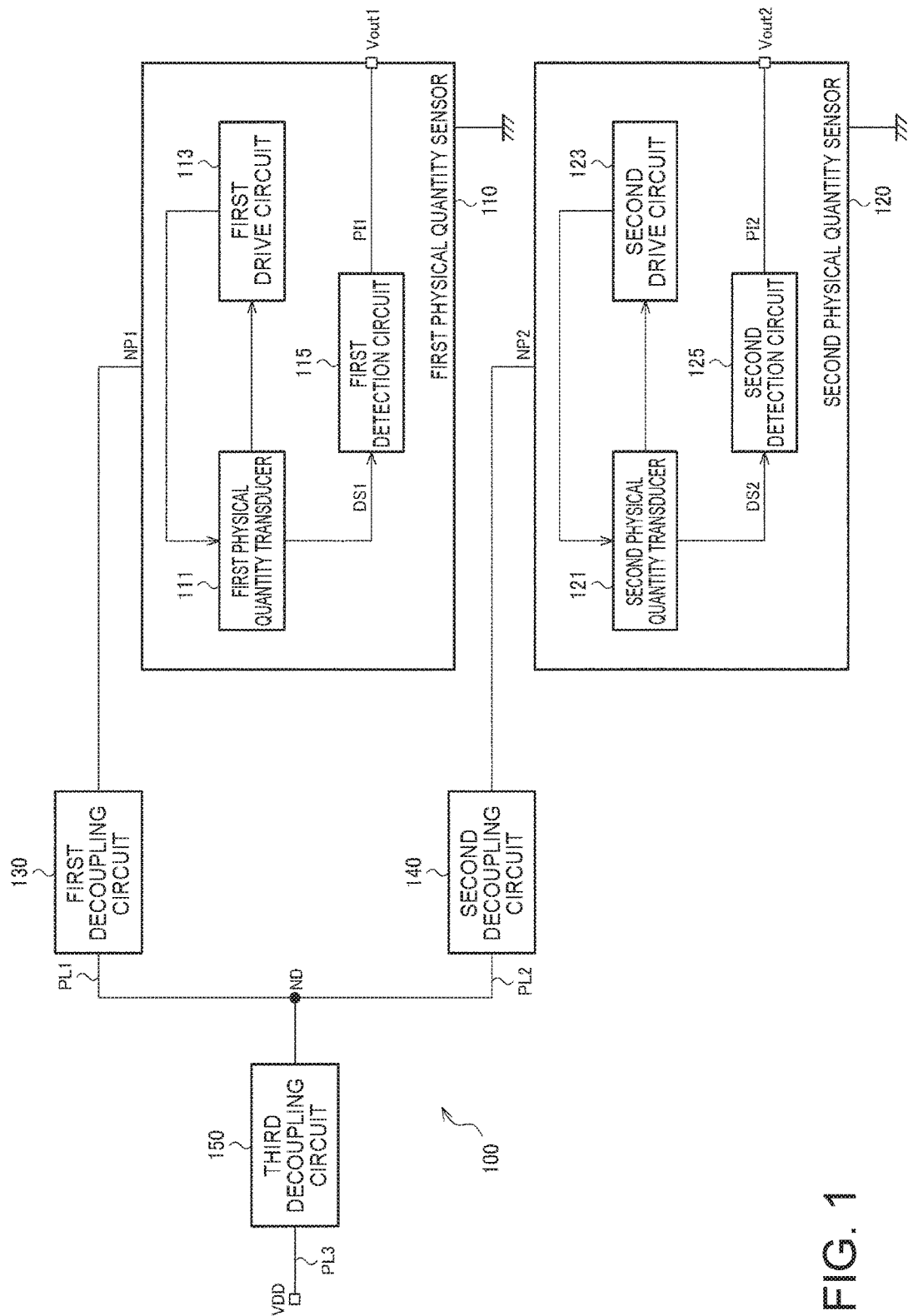
FIG. 1 is a configuration example of a physical quantity detection system according to the present embodiment.

A configuration example of a physical quantity detection system according to the present embodiment is illustrated in FIG. 1. A physical quantity detection system 100 according to the present embodiment includes a first physical quantity sensor 110, a second physical quantity sensor 120, a first power supply line PL1, a second power supply line PL2, a first decoupling circuit 130, and a second decoupling circuit 140. The physical quantity detection system 100 is not limited to a configuration of FIG. 1, and various modifications, such as omission of partial configuration elements thereof or addition of other configuration elements can be made. For example, a third decoupling circuit 150 is provided in FIG. 1, but modification can also be made without providing the third decoupling circuit 150.

In addition, the first physical quantity sensor 110 includes a first physical quantity transducer 111, a first drive circuit 113 driving the first physical quantity transducer 111, and a first detection circuit 115. The first detection circuit 115 outputs first physical quantity information PI1 corresponding to a first physical quantity, based on a first detection signal DS1 which is outputted from the first physical quantity transducer 111. The first physical quantity information PI1 is an output signal of the first physical quantity sensor 110.

In the same manner, the second physical quantity sensor 120 includes a second physical quantity transducer 121, a second drive circuit 123 driving the second physical quantity transducer 121, and a second detection circuit 125. The second detection circuit 125 outputs second physical quantity information PI2 corresponding to a second physical quantity, based on a second detection signal DS2 which is outputted from the second physical quantity transducer 121. The second physical quantity information PI2 is an output signal of the second physical quantity sensor 120.

Here, the output signal of the sensor (first physical quantity information PI1 or second physical quantity information PI2) may be a voltage signal, and may be a digital signal.

For example, the first physical quantity sensor 110 and the second physical quantity sensor 120 are gyro sensors. In this case, the first physical quantity information PI1 and the second physical quantity information PI2 is, for example, angular rate information, and the first physical quantity and the second physical quantity are, for example, angular velocities. In addition, the first physical quantity transducer 111 outputs a first gyro sensor signal as, for example, the first detection signal DS1, and the first detection circuit 115 outputs first angular rate information to a first output node Vout1 as the first physical quantity information PI1. Meanwhile, the second physical quantity transducer 121 outputs a second gyro sensor signal as, for example, the second detection signal DS2, and the second detection circuit 125 outputs second angular rate information to a second output node Vout2 as the second physical quantity information PI2.

In a case of a so-called analog gyro sensor, the angular rate information is a voltage signal, and a DC voltage level of the voltage signal indicates a magnitude of a detected angular rate. In addition, in a case of a digital gyro sensor including an A/D conversion circuit or a digital signal processing unit, angular rate information is a digital signal, and a numeral value denoted by the digital signal indicates a magnitude of an angular rate. In addition, the first angular rate information is information indicating a first angular rate around a first rotation axis, and the second angular rate information is information indicating a second angular rate around a second rotation axis different from a first rotation axis.

Accordingly, it is possible to detect angular rate information around at least two rotation axes, or the like. However, in the present embodiment, the physical quantity sensor is not limited to the gyro sensor, and may be an acceleration sensor or a module sensor (body motion sensor).

Each of the first physical quantity transducer 111 and the second physical quantity transducer 121 may have the same configuration as, for example, a physical quantity transducer 10, corresponding to the physical quantity transducer (vibrator element) 10 which will be described below by suing FIG. 15. In the same manner, each of the first drive circuit 113 and the second drive circuit 123 may have the same configuration as, for example, a drive circuit 30, corresponding to the drive circuit 30 which will be described below by using FIG. 16. Furthermore, each of the first detection circuit 115 and the second detection circuit 125 may have the same configuration as, for example, a detection circuit 60, corresponding to the detection circuit 60 which will be described below by using FIG. 16. Accordingly, description for a detailed configuration thereof will be omitted herein.

In addition, a power supply voltage which is supplied to the first physical quantity sensor 110 from a common power supply VDD of the first physical quantity sensor 110 and the second physical quantity sensor 120 is applied to the first power supply line PL1. Meanwhile, a power supply voltage which is supplied to the second physical quantity sensor 120 from the common power supply VDD is applied to the second power supply line PL2.

In addition, the first decoupling circuit 130 (first bypass capacitor circuit) is connected to a path of the first power supply line PL1, and has first band elimination frequency characteristics. Here, a cutoff frequency on a low frequency side of the first band elimination frequency characteristics is set to $f_{CL1}$, and a cutoff frequency of a high frequency side of the first band elimination frequency characteristics is set to $f_{CH1}$.

Meanwhile, the second decoupling circuit 140 (second bypass capacitor circuit) is connected to a path of the second power supply line PL2, and has second band elimination frequency characteristics. Here, a cutoff frequency on a low frequency side of the second band elimination frequency characteristics is set to $f_{CL2}$, and a cutoff frequency of a high frequency side of the second band elimination frequency characteristics is set to $f_{CH2}$. Specific configurations of the first decoupling circuit 130 and the second decoupling circuit 140 will be described with reference to FIG. 11 to FIG. 13B.

In the present embodiment, the power supply voltage is supplied to at least the two physical quantity sensors installed on the same substrate from the common power supply VDD. In addition, a sensor device described in JP-A-2013-217813 uses drive frequencies different from each other as drive frequencies of each of multiple sensor elements. Also in the present embodiment, there is an individual difference between the first physical quantity transducer 111 of the first physical quantity sensor 110 and the second physical quantity transducer 121 of the second physical quantity sensor 120, due to manufacturing variation or the like, and thereby the two drive frequencies do not coincide with each other, and there is a slight difference. Here, for example, the first drive frequency of the first drive circuit 113 is set to $f_{d1}$, and the second drive frequency of the second drive circuit 123 is set to $f_{d2}$. At this time, $|f_{d1}-f_{d2}|$ does not become zero, in many cases. The drive frequency may be appropriately determined according to a dimension, a shape, or a material of a physical quantity transducer, usage of a sensor device, or the like.

Figure 2:
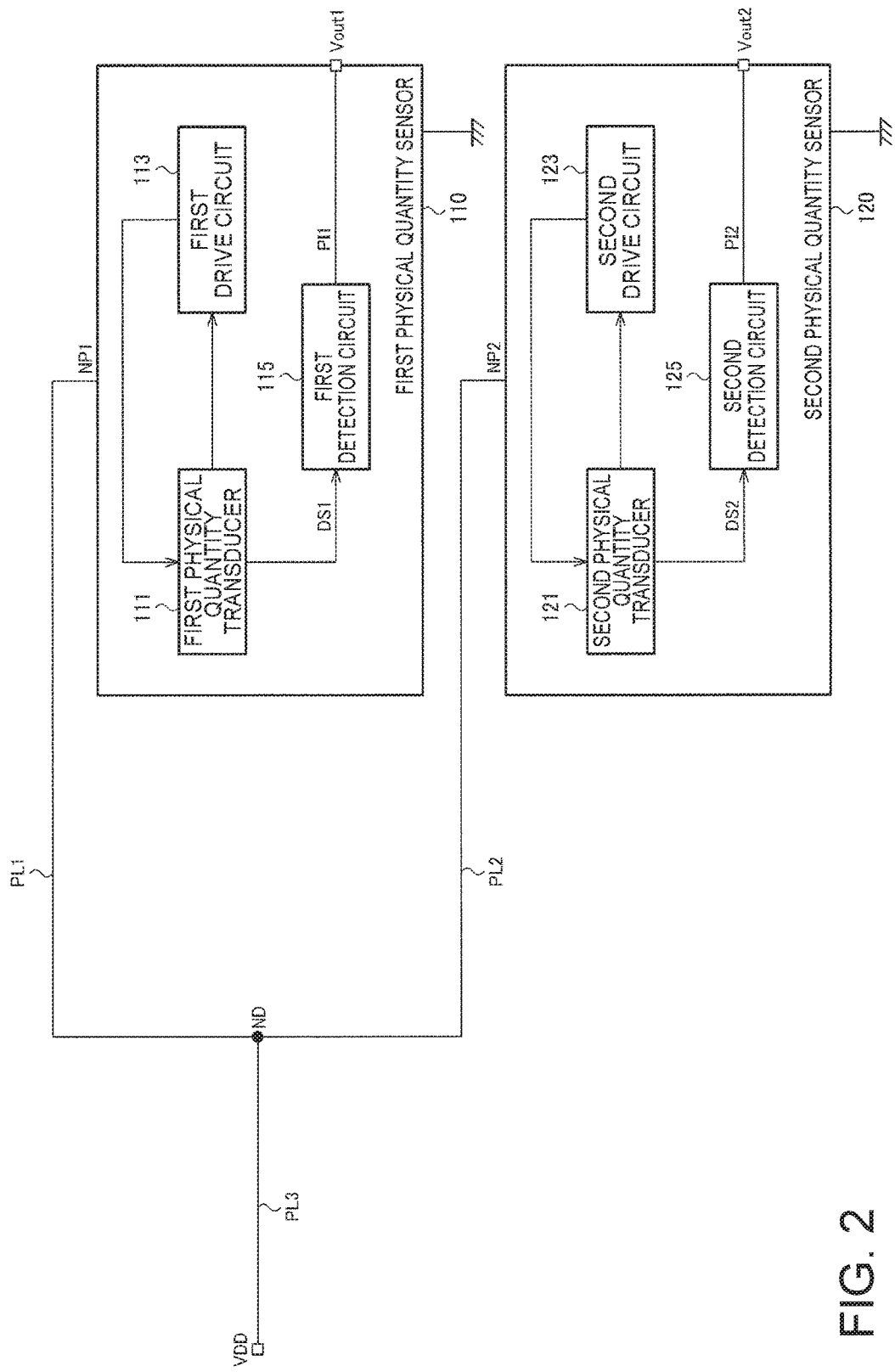
FIG. 2 is a configuration example of a physical quantity detection system not having a decoupling circuit.

Meanwhile, a configuration example of a physical quantity detection system without a decoupling circuit is illustrated in FIG. 2. The physical quantity detection system illustrated in FIG. 2 has the same configuration as the physical quantity detection system 100 illustrated in FIG. 1, except that the physical quantity detection system illustrated in FIG. 2 has no decoupling circuit, and the same type of a physical quantity sensor is also used for the first physical quantity sensor 110 and the second physical quantity sensor 120. Accordingly, there is also a slight difference due to manufacturing variation, in the first drive frequency $f_{d1}$ of the first physical quantity sensor 110 and the second drive frequency $f_{d2}$ of the second physical quantity sensor 120.

In the physical quantity detection system illustrated in FIG. 2, a power supply voltage is supplied to the first physical quantity sensor 110 and the second physical quantity sensor 120 from a common power supply, and thus, drive frequency components of one physical quantity sensor are inputted to the other physical quantity sensor through a power line.

For example, components of the first drive frequency $f_{d1}$ are inputted to the second physical quantity sensor 120, and components of the second drive frequency $f_{d2}$ are inputted to the first physical quantity sensor 110.

Figure 3:
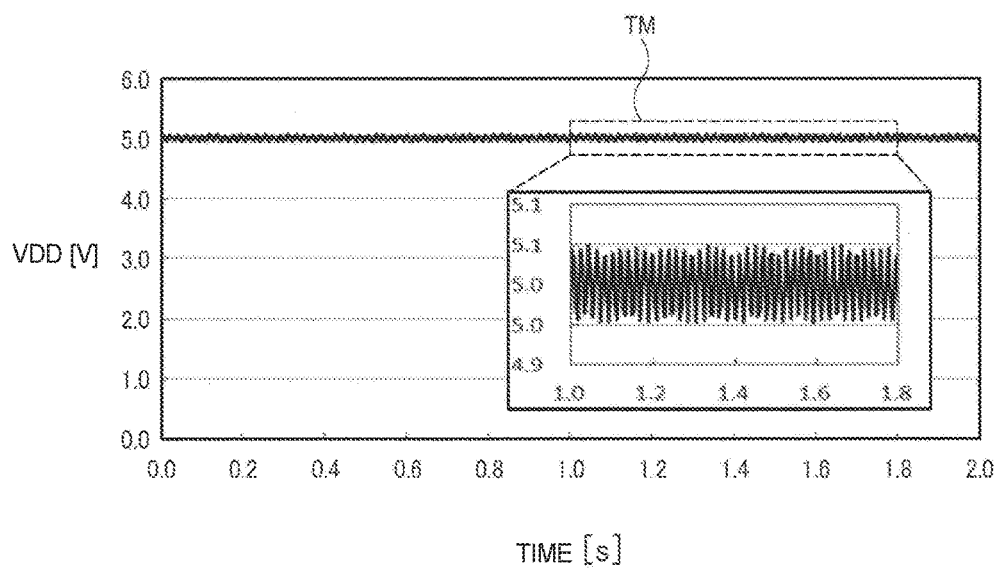
FIG. 3 is an explanatory diagram of a power supply voltage in which drive frequency components are superimposed.

More specifically, a specific example of the power supply VDD in which the components of the first drive frequency $f_{d1}$ and the components of the second drive frequency $f_{d2}$ are superimposed to each other is illustrated in FIG. 3. In a graph of FIG. 3, a vertical axis denotes the power supply VDD [V], and a horizontal axis denotes time [s]. Furthermore, a state of variation of the power supply VDD around 5 [V] of a partial period TM is illustrated in the same figure in an enlarged manner. According to the related art, the power supply VDD is fixed to 5 [V], but components of the first drive frequency $f_{d1}$ and the components of the second drive frequency $f_{d2}$ are superimposed as illustrated in the enlarged diagram of FIG. 3, and thus, the power supply VDD finely varies. In this example, the power supply VDD which finely varies is supplied to the first physical quantity sensor 110 and the second physical quantity sensor 120.

At this time, the first detection circuit 115 (or second detection circuit 125) multiplies two drive frequencies ($f_{d1}$ and $f_{d2}$) using a function of a synchronization detection circuit (62 illustrated in FIG. 16) which will be described below, and outputs both a frequency which is obtained by adding the first drive frequency $f_{d1}$ to the second drive frequency $f_{d2}$ and a frequency which is obtained by subtracting the second drive frequency $f_{d2}$ from the first drive frequency $f_{d1}$, using a heterodyne principle, as beat noise (beat signal). The beat noise is amplified by a DC amplifier, and is generated as output variation of the first physical quantity sensor 110 (or second physical quantity sensor 120).

Figure 4:
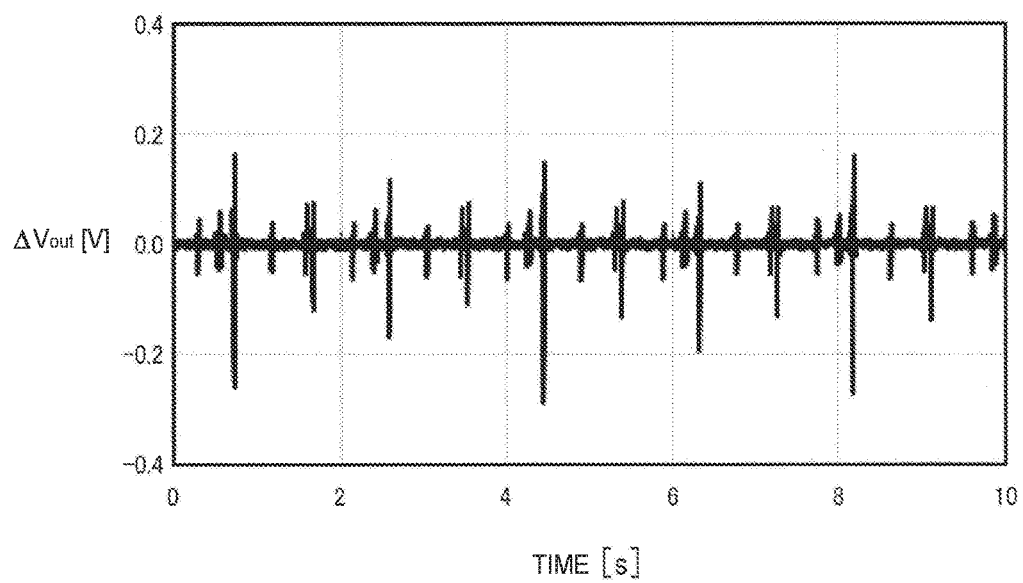
FIG. 4 is an explanatory diagram of an output variation amount of an output signal of a sensor due to beat noise.

For example, FIG. 4 illustrates an example of the output variation amount of the output signal of the sensor due to the beat noise of a drive frequency difference of 0.5 Hz (=$|f_{d1}-f_{d2}|$). In the graph of FIG. 4, a vertical axis denotes the output variation amount ΔVout [V] of the output signal of the sensor, and a horizontal axis denotes time [s]. For example, at a timing of ΔVout=0.18 [V], ΔVout indicates that the output signal of the sensor is outputted as a voltage higher than an original value by 0.18 [V]. That is, in the graph of FIG. 4, if the output variation amount ΔVout is 0 [V], it can be said that the output signal of the sensor is not affected by the beat noise, but actually, the output signal of the sensor periodically varies due to the beat noise, as illustrated in FIG. 4. In this way, for example, if an angular rate is calculated based on the output signal of the sensor in which the beat noise is included, the beat noise components become an error of the angular rate, and thus, it is not possible to calculate a correct angular rate.

Figure 5:
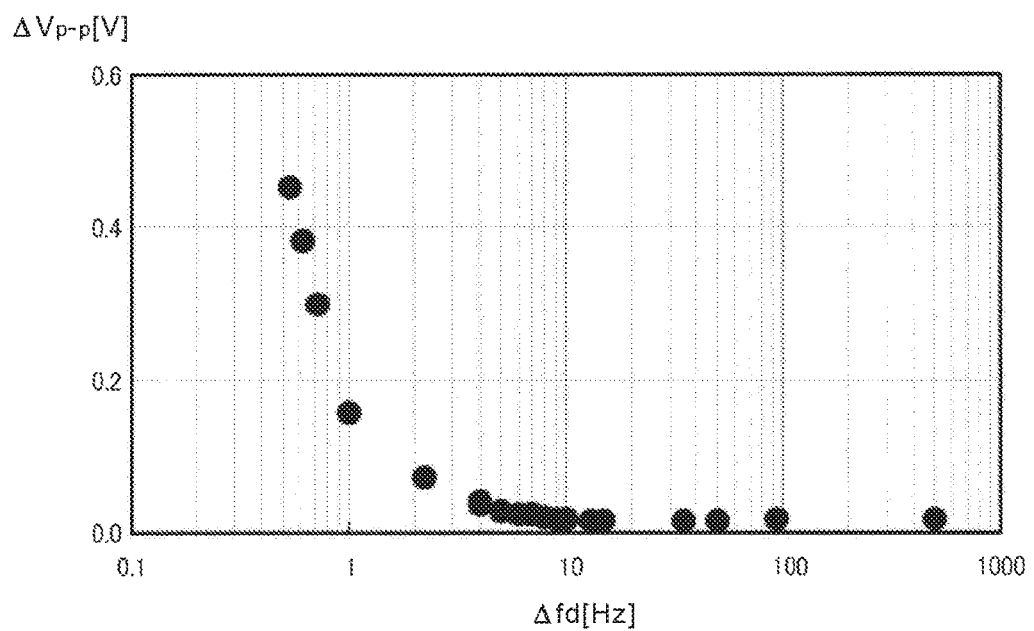
FIG. 5 is an explanatory diagram of frequency characteristics of a peak-to-peak difference amount of the output variation amount of the output signal of the sensor.

Furthermore, the output variation amount ΔVout of the output signal of the sensor changes due to the drive frequency difference Δfd (=$|f_{d1}-f_{d2}|$), as illustrated in a graph of FIG. 5. In the graph of FIG. 5, a vertical axis denotes the peak-to-peak difference amount $\Delta V_{p-p}$ [V] of the output variation amount ΔVout of the output signal of the sensor, and a horizontal axis denotes the drive frequency difference Δfd [Hz]. The peak-to-peak difference amount $\Delta V_{p-p}$ is a difference between a maximum value and a minimum value of the output variation amount ΔVout illustrated in the graph of FIG. 4. That is, it is considered that, the more the peak-to-peak difference amount $\Delta V_{p-p}$ is, the more the output variation amount of the output signal of the sensor with respect to the drive frequency difference Δfd thereof is. As illustrated in the graph of FIG. 5, the smaller the drive frequency difference Δfd is, the more the peak-to-peak difference amount $\Delta V_{p-p}$ of the output signal of the sensor is, and particularly, effects of the beat noise significantly increase in a region of the drive frequency difference Δfd≤1 Hz. Particularly, as described in the present embodiment, in a case where the same physical quantity sensor is used, there is a possibility that the drive frequency difference is equal to or less than 10 Hz due to manufacturing variation, and thus, there is a problem in which output variation of the output signal of the sensor increases.

Figure 6A:
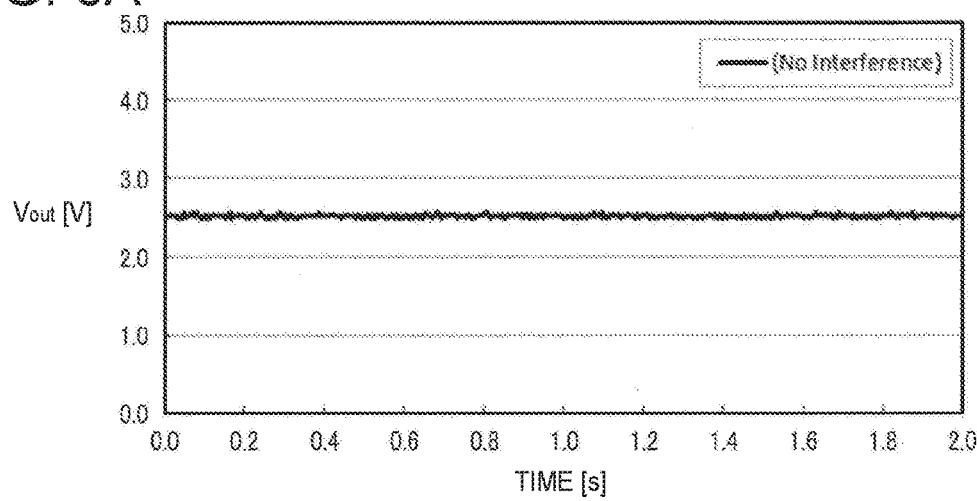
FIGS. 6A to 6C are explanatory diagrams of specific examples of the output signal of the sensor.
Figure 6B:
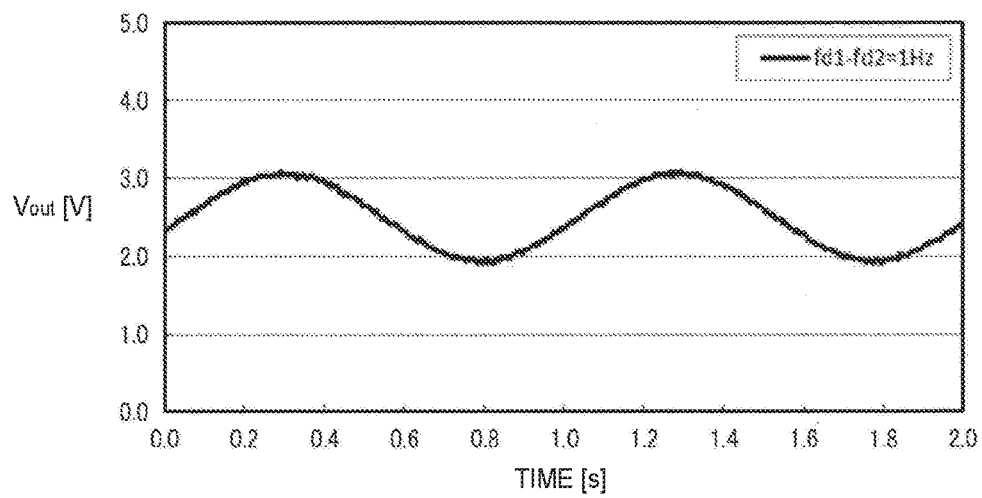
Figure 6C:
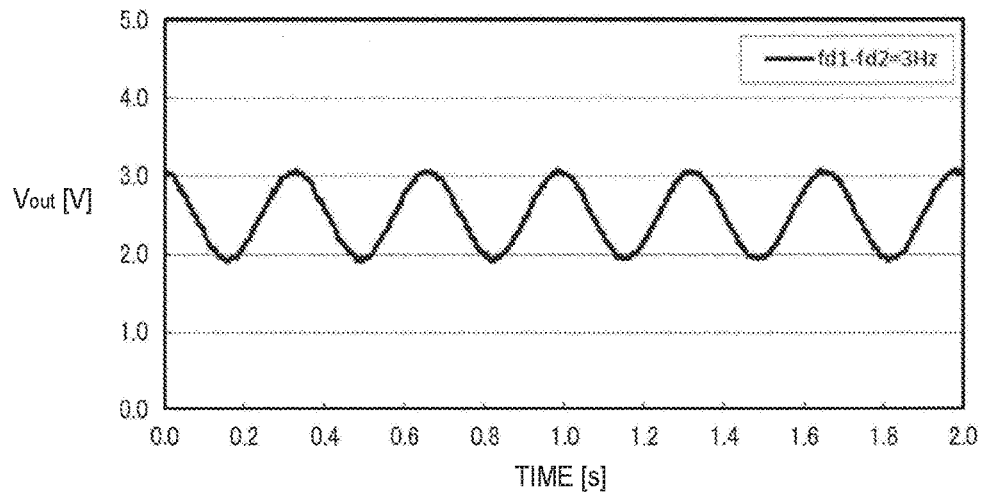

In addition, FIGS. 6A to 6C illustrate specific examples of the output signal of the sensor. FIG. 6A illustrates the output signal of the sensor in a case where drive frequency components do not interfere with the power supply VDD. FIG. 6B illustrates the output signal of the sensor in a case where the drive frequency difference Δfd=1 Hz and the drive frequency components interfere with the power supply VDD. In addition, FIG. 6C illustrates the output signal of the sensor in a case where the drive frequency difference Δfd=3 Hz and the drive frequency components interfere with the power supply VDD. In each graph of FIGS. 6A to 6C, a vertical axis denotes the output signal of the sensor Vout [V], and a horizontal axis denotes time [s]. In this way, an amplitude of the output signal of the sensor periodically varies according to the drive frequency difference.

As described above, in the physical quantity detection system without a decoupling circuit illustrated in FIG. 2, the output signal of the sensor varies due to the drive frequency difference, in a case where multiple physical quantity sensors use the same power supply voltage on the same substrate, and thus, it is not possible to measure a correct physical quantity.

Hence, the physical quantity detection system 100 according to the present embodiment uses the first decoupling circuit 130 having first band elimination frequency characteristics in which a relationship of $f_{CL1}<f_{d1}<f_{CH1}$ is satisfied and the second decoupling circuit 140 having second band elimination frequency characteristics in which a relationship of $f_{CL2}<f_{d2}<f_{CH2}$ is satisfied, as illustrated in FIG. 1.

Figure 7:
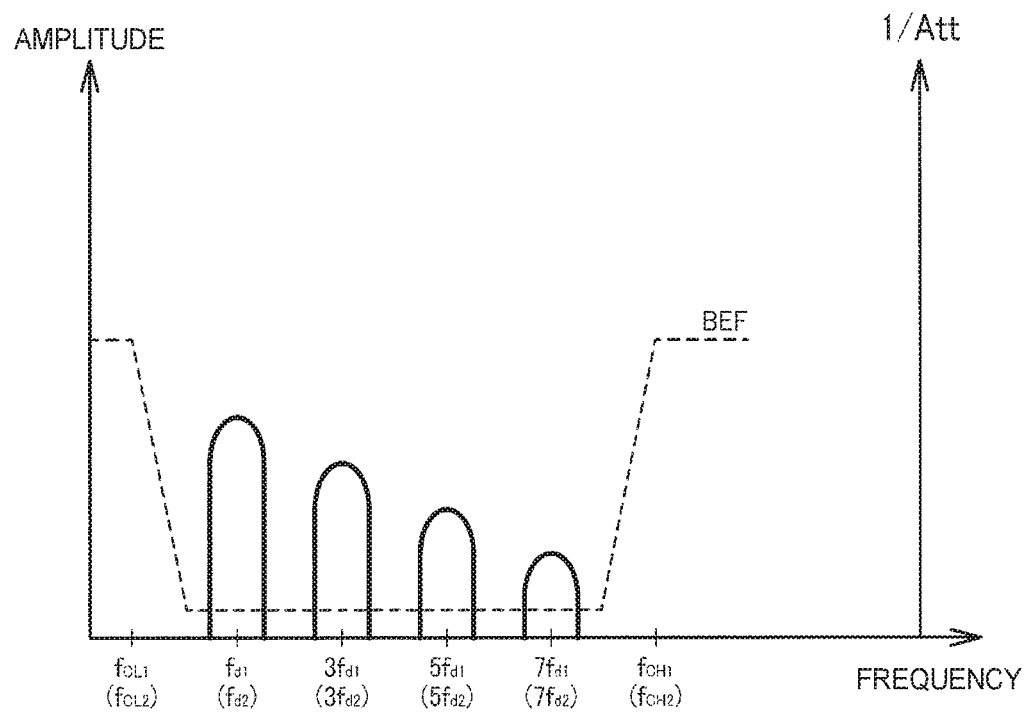
FIG. 7 is an explanatory diagram of attenuation processing of the drive frequency components performed by a band elimination filter.

The first decoupling circuit 130 having the first band elimination frequency characteristics in which a relationship of $f_{CL1}<f_{d1}<f_{CH1}$ is satisfied functions as a band elimination filter BEF illustrated in FIG. 7. In the graph of FIG. 7, a solid line denotes AC components (first drive frequency $f_{d1}$ or second drive frequency $f_{d2}$) of the power supply VDD illustrated in FIG. 3, and a dashed line denotes attenuation characteristics of the first decoupling circuit 130 which can attenuate (remove) a predetermined frequency band. In addition, a vertical axis denotes an amplitude in AC components and a reciprocal number (1/Att) of an attenuation rate Att in the attenuation characteristics, and a horizontal axis denotes a frequency. Accordingly, the first decoupling circuit 130 attenuates the components of the first drive frequency $f_{d1}$ of the first physical quantity sensor 110 which is superimposed with the power supply VDD, thereby being able to reduce the components of the first drive frequency $f_{d1}$ which is inputted to the second physical quantity sensor 120.

In the same manner, the second decoupling circuit 140 having the second band elimination frequency characteristics in which $f_{CL2}<f_{d2}<f_{CH2}$ functions as the band elimination filter BEF illustrated in FIG. 7. Accordingly, the second decoupling circuit 140 attenuates the components of the second drive frequency $f_{d2}$ of the second physical quantity sensor 120 which is superimposed with the power supply VDD, thereby being able to reduce the components of the second drive frequency $f_{d2}$ which is inputted to the first physical quantity sensor 110. Specific operations of the first decoupling circuit 130 and the second decoupling circuit 140 will be described below.

As described above, if the components of the first drive frequency $f_{d1}$ and the components of the second drive frequency $f_{d2}$ which are included in the power supply VDD can be reduced, frequency components which are obtained by adding together or subtracting from each the first drive frequency $f_{d1}$ and the second drive frequency $f_{d2}$ which are generated by a synchronization detection circuit (62 illustrated in FIG. 16) of each physical quantity sensor can be reduced, and as a result, beat noise can be reduced. Hence, in a case where multiple physical quantity sensors are driven by using a common power supply, it is possible to prevent the beat noise from being generated.

As described above, if the components of the first drive frequency $f_{d1}$ which are superimposed with the power supply VDD are reduced by the first decoupling circuit 130 and the components of the second drive frequency $f_{d2}$ which are superimposed with the power supply VDD are reduced by the second decoupling circuit 140, the beat noise which is caused by the first physical quantity sensor 110 and the second physical quantity sensor 120 can be reduced. However, in a case where an external noise frequency with a frequency components close to the first drive frequency $f_{d1}$ or the second drive frequency $f_{d2}$ are inputted from the power supply VDD side, the beat noise can be generated in the output signal of each physical quantity sensor. For example, if a difference between the external noise frequency and the drive frequency (first drive frequency $f_{d1}$ or second drive frequency $f_{d2}$) is equal to or less than 10 Hz, the beat noise significantly increases by the heterodyne principle.

Hence, the physical quantity detection system 100 according to the present embodiment includes a third power supply line PL3 which applies power supply voltage to the first power supply line PL1 and the second power supply line PL2, and the third decoupling circuit 150 which is connected to a path of the third power supply line PL3, as illustrated in FIG. 1.

Figure 8:
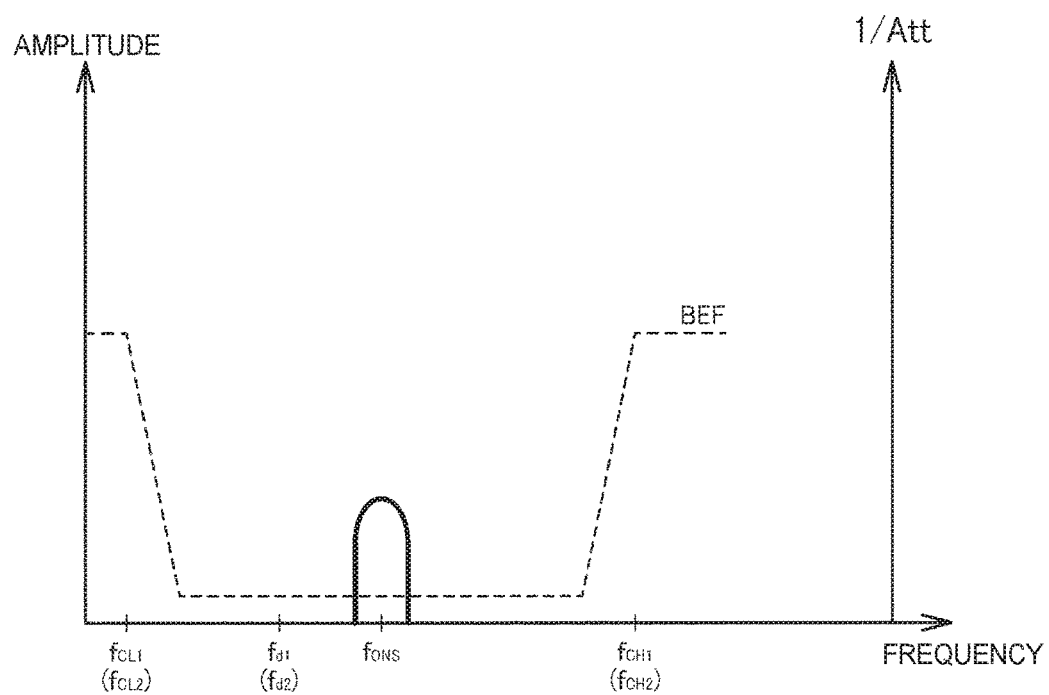
FIG. 8 is an explanatory diagram of attenuation processing of external noise components performed by the band elimination filter.

In addition, the third decoupling circuit 150 reduces components of an external noise frequency $f_{ONS}$ which are inputted from the power supply VDD side, as illustrated in FIG. 8. In a graph of FIG. 8, a solid line denotes the components of the external noise frequency $f_{ONS}$, and a dashed line denotes attenuation characteristics of the third decoupling circuit 150 which can attenuate (remove) a predetermined frequency band. In addition, a vertical axis denotes an amplitude in the components of the external noise frequency $f_{ONS}$ and the reciprocal number (1/Att) of the attenuation rate Att in the attenuation characteristics, and a horizontal axis denotes a frequency. As illustrated in FIG. 8, the third decoupling circuit 150 functions as the band elimination filter BEF having the first band elimination frequency characteristics in which a relationship of $f_{CL1}<f_{d1}<f_{CH1}$ is satisfied or the second band elimination frequency characteristics in which a relationship of $f_{CL2}<f_{d2}<f_{CH2}$ is satisfied. Accordingly, the third decoupling circuit 150 attenuates the components of the external noise frequency $f_{ONS}$ which is superimposed with the power supply VDD, thereby being able to reduce the components of the external noise frequency $f_{ONS}$ which is inputted to the first physical quantity sensor 110 and the second physical quantity sensor 120.

Accordingly, in a case where the components of the external noise frequency in a frequency band of the first drive frequency $f_{d1}$ or a frequency band of the second drive frequency $f_{d2}$ are inputted, it is possible to prevent the beat noise from being generated. The frequency band of the first drive frequency $f_{d1}$ is a frequency band from, for example, $f_{CL1}$ to $f_{CH1}$, or the frequency band of the second drive frequency $f_{d2}$ is a frequency band from, for example, $f_{CL2}$ to $f_{CH2}$.

Here, the first drive circuit 113 and the second drive circuit 123 respectively drive the first physical quantity transducer 111 and the second physical quantity transducer 121, using drive signals with rectangular waves.

A method of driving the physical quantity transducer using the drive signal with a rectangular wave has an advantage of reduction of variation of the drive signal. In addition, an amplitude of a voltage is easily controlled, and thus, it is possible to make a simple configuration of a circuit and to reduce a size of a circuit.

Figure 9:
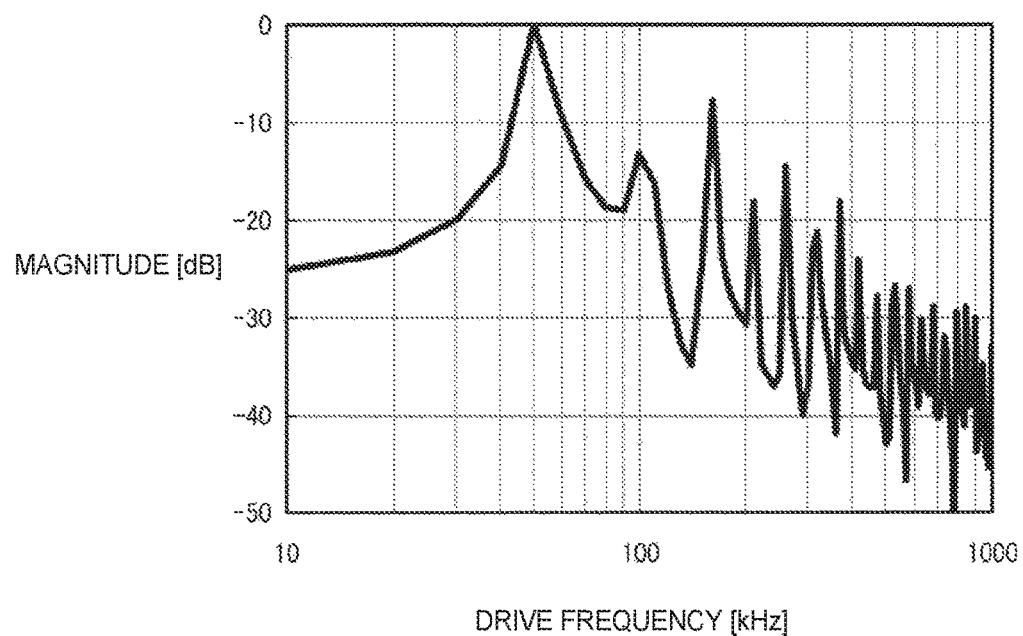
FIG. 9 is an explanatory diagram of frequency characteristics of a drive frequency.

Meanwhile, since the physical quantity transducer is driven by the drive signal with a rectangular wave, the drive frequency also includes components of a high frequency of integer multiple of a fundamental wave. Particularly, the drive frequency includes lots of components of harmonics of odd multiple. For example, FIG. 9 illustrates an example of frequency characteristics of the drive frequency in which a frequency of a fundamental wave is 50 kHz. In a graph of FIG. 9, a horizontal axis denotes a frequency (drive frequency) [kHz], and a vertical axis denotes a magnitude [dB] of a signal corresponding to the frequency of the horizontal axis. As described above, components of 150 kHz, 250 kHz, and 350 kHz which are components of harmonics of odd multiple of the drive frequency strongly appear in the example of FIG. 9.

Thus, it is preferable that not only the drive frequency but also the components of harmonics of integer multiple of the drive frequency, particularly, the components of harmonics of odd multiple are reduced by a decoupling circuit, so as to reduce the beat noise.

Hence, the physical quantity detection system 100 according to the present embodiment uses the first decoupling circuit 130 having first band elimination frequency characteristics in which a relationship of $f_{CL1} < f_{d1} < 3 \times f_{d1} < f_{CH1}$ is satisfied and the second decoupling circuit 140 having second band elimination frequency characteristics in which a relationship of $f_{CL2} < f_{d2} < 3 \times f_{d2} < f_{CH2}$ is satisfied.

For example, the band elimination filter BEF which is controlled by the first decoupling circuit 130 attenuates (removes) the components of the first drive frequency $f_{d1}$ and third harmonics ($3f_{d1}$), as illustrated in FIG. 7. In the same manner, the band elimination filter BEF which is controlled by the second decoupling circuit 140 attenuates (removes) the components of the second drive frequency $f_{d2}$ and third harmonics ($3f_{d2}$), as illustrated in FIG. 7. The first decoupling circuit 130 and the second decoupling circuit 140 can remove components of each of not only the drive frequency $f_{d1}$ ($f_{d2}$) and three times the drive frequency $f_{d1}$ ($f_{d2}$), but also frequencies $f_{d1}$ ($f_{d2}$) to $3f_{d1}$ ($3f_{d2}$).

Thereby, it is possible to reduce the components of harmonics of the drive frequency of one physical quantity sensor, and to prevent the other physical quantity sensor from being adversely affected by the components of harmonics.

Furthermore, the physical quantity detection system 100 according to the present embodiment may use the first decoupling circuit 130 having first band elimination frequency characteristics in which a relationship of $f_{CL1} < f_{d1} < 3 \times f_{d1} < 5 \times f_{d1} < 7 \times f_{d1} < f_{CH1}$ is satisfied and the second decoupling circuit 140 having second band elimination frequency characteristics in which a relationship of $f_{CL2} < f_{d2} < 3 \times f_{d2} < 5 \times f_{d2} < 7 \times f_{d2} < f_{CH2}$ is satisfied.

For example, the band elimination filter BEF which is controlled by the first decoupling circuit 130 attenuates (removes) the components of the first drive frequency $f_{d1}$ and the third harmonics ($3f_{d1}$), fifth harmonics ($5f_{d1}$), and seventh harmonics ($7f_{d1}$), as illustrated in FIG. 7. In the same manner, the band elimination filter BEF which is controlled by the second decoupling circuit 140 attenuates (removes) the components of the second drive frequency $f_{d2}$, the third harmonics ($3f_{d2}$), fifth harmonics ($5f_{d2}$), and seventh harmonics ($7f_{d2}$), as illustrated in FIG. 7. The first decoupling circuit 130 and the second decoupling circuit 140 can remove components of each of not only the drive frequency $f_{d1}$ ($f_{d2}$) and three times, five times, and seven times the drive frequency $f_{d1}$ ($f_{d2}$), but also frequencies $f_{d1}$ ($f_{d2}$) to $7f_{d1}$ ($7f_{d2}$).

Thereby, it is possible to reduce the components of harmonics of the drive frequency of one physical quantity sensor, furthermore the components of high harmonics thereof, and to prevent the other physical quantity sensor from being adversely affected by the components of harmonics.

In addition, when the band elimination filter BEF which can attenuate, for example, the drive frequency and seven times the drive frequency is configured, a cutoff frequency $f_{CL1}$ ($f_{CL2}$) on a low frequency side may be designed to be close to the drive frequency $f_{d1}$ ($f_{d2}$), as illustrated in FIG. 7.

Next, filter processing is performed for a detection signal whose synchronization detection is completed, and whether or not the beat noise can be removed will be described by using FIGS. 10A to 10C. As will be described below by using FIG. 16, the synchronization detection circuit 62 is provided in the first detection circuit 115 of the first physical quantity sensor 110 and the second detection circuit 125 of the second physical quantity sensor 120, and furthermore a filter unit 63 (analog filter and digital filter) is provided in a rear stage of the synchronization detection circuit 62.

FIG. 10A illustrates a frequency spectrum before synchronization detection is performed. As illustrated in FIG. 10A, a desired signal DS, an unnecessary signal NS1 of DC offset, and an unnecessary signal NS2 of mechanical vibration leakage exist in the detection signal whose synchronization detection is not performed. In graphs of FIGS. 10A to 10C, a vertical axis denotes amplitudes of each signal, and a horizontal axis denotes a frequency.

If the synchronization detection for the detection signal is performed, a frequency spectrum illustrated in FIG. 10B is obtained. That is, the desired signal DS appears in a DC frequency band, and furthermore, beat noise BN also appears in a DC frequency band, in the detection signal whose synchronization detection is completed. At this time, it is assumed that an upper side frequency of the desired signal is set to $F_g$, a frequency of the beat noise BN is set to $|f_{d1} - f_{d2}|$, and a relation of $|f_{d1} - f_{d2}| < f_g$ is satisfied. The upper side frequency $f_g$ of the desired signal is an upper side frequency of a detection frequency band of first physical quantity information and second physical quantity information.

Meanwhile, in FIG. 10B illustrating a state where synchronization detection is completed, the unnecessary signal NS1 of the DC offset and the unnecessary signal NS2 of the mechanical vibration leakage appear on a higher frequency side than the upper side frequency $f_g$ of the desired signal.

Accordingly, filter processing (low pass filter processing) for the detection signal whose synchronization detection is completed is performed by the filter unit 63, and thereby the unnecessary signal NS1 of the DC offset and the unnecessary signal NS2 of the mechanical vibration leakage can be removed, as illustrated in FIG. 10C. In a graph illustrated in FIG. 10C, an LPF denotes attenuation characteristics of a low pass filter, and the attenuation characteristics correspond to a vertical axis illustrated on the right side of the graph. The vertical axis illustrated on the right side of the graph denotes the reciprocal number (1/Att) of the attenuation rate Att.

However, the beat noise BN exists in a low frequency band including a DC band, and thus, the beat noise BN is unable to be removed by the low pass filter LPF of the filter unit 63. That is, in a case where a relationship of $|f_{d1}-f_{d2}|<f_g$ is satisfied, beat noise corresponding to the frequency of $|f_{d1}-f_{d2}|$ is unable to be removed by the filter unit 63 provided in a rear stage of the synchronization detection circuit 62.

However, as described above, the first decoupling circuit 130 to the third decoupling circuit 150 are provided in the present embodiment. Hence, the first decoupling circuit 130 to the third decoupling circuit 150 reduce the components of each drive frequency which is superimposed with the power supply voltage, and thus, it is possible to prevent the beat noise at the time of the synchronization detection illustrated in FIG. 10B from being generated. That is, before the beat noise is generated, the components of the drive frequency causing the beat noise are prevented from being inputted to other physical quantity sensor, and thus, it is possible to prevent the beat noise at the time of synchronization detection from being generated. Accordingly, even in a case where $|f_{d1}-f_{d2}|<f_g$ is satisfied and the beat noise is unable to be removed by the filter processing whose synchronization detection is completed, it is possible to acquire correct physical quantity information or the like.

2. Decoupling Circuit

Next, FIG. 11A illustrates a specific configuration of a decoupling circuit. As illustrated in FIG. 11A, the first decoupling circuit 130 includes a first capacitor C1 and a second capacitor C2 having a different capacitance value from that of the first capacitor C1.

At this time, the first capacitor C1 and the second capacitor C2 are provided between a first power supply line PL1 through which power on a high potential side is supplied, and a power supply node NL on a low potential side. More specifically, one terminal of the first capacitor C1 is connected to the first power supply line PL1, and the other terminal thereof is connected to the power supply node NL on the low potential side. In addition, one terminal of the second capacitor C2 is also connected to the first power supply line PL1, and the other terminal thereof is connected to the power supply node NL on the low potential side.

In addition, the second decoupling circuit 140 can also be configured in the same manner as in FIG. 11A. That is, in this case, the second decoupling circuit 140 includes a third capacitor C3 and a fourth capacitor C4 with a capacitance value different from that of the third capacitor C3, as illustrated in FIG. 11A.

At this time, the third capacitor C3 and the fourth capacitor C4 are provided between a second power supply line PL2 through which power on the high potential side is supplied, and the power supply node NL on the low potential side. More specifically, one terminal of the third capacitor C3 is connected to the second power supply line PL2, and the other terminal thereof is connected to the power supply node NL on the low potential side. In addition, one terminal of the fourth capacitor C4 is also connected to the second power supply line PL2, and the other terminal thereof is connected to the power supply node NL on the low potential side. The number of capacitors included in the first decoupling circuit 130 and the second decoupling circuit 140 is not limited to two, and may be three or more.

In addition, impedance |Z| of the decoupling circuit illustrated in FIG. 11A has frequency characteristics illustrated in FIG. 11B. In addition, FIG. 11C illustrates frequency characteristics of impedance $|Z_{C1}|$ of the first capacitor C1, and FIG. 11D illustrates frequency characteristics of impedance $|Z_{C2}|$ of the second capacitor C2. In graphs of FIGS. 11B to 11D, a vertical axis denotes impedance, and a horizontal axis denotes a frequency.

In an ideal capacitor, the higher the frequency is, the smaller the impedance is. However, actually, there exists residual inductance caused by a lead line, an electrode pattern of a capacitor, or the like. Accordingly, the higher the frequency is, the larger the impedance is, in a frequency band HBW1 (HBW2) equal to or higher than a self-resonance frequency $f_{C1}$ ($f_{C2}$) of a capacitor, as illustrated in FIG. 11C (or 11D). Accordingly, an actual capacitor has a minimum impedance $Z_{min1}$ ($Z_{min2}$) at the self-resonance frequency $f_{C1}$ ($f_{C2}$), and the larger the difference between a frequency and the self-resonance frequency $f_{C1}$ ($f_{C2}$) is, the larger the impedance is.

In addition, the smaller the capacitance is, the more the self-resonance frequency of a capacitor moves on a high frequency side. In the present example, a capacitor with capacitance of 10 μF is used as, for example, the first capacitor C1, and a capacitor with capacitance of 0.1 μF is used as, for example, the second capacitor C2. In this case, the self-resonance frequency $f_{C2}$ of the second capacitor C2 is higher than the self-resonance frequency $f_{C1}$ of the first capacitor C1 ($f_{C1}<f_{C2}$), as illustrated in FIGS. 11C and 11D.

In addition, the decoupling circuit illustrated in FIG. 11A uses two capacitors (C1 and C2) with capacitances different from each other, and thus, the impedance |Z| is equal to impedance which is obtained by adding together impedances of each capacitor ($|Z_{C1}|$ and $|Z_{C2}|$), as illustrated in FIG. 11B.

In the examples of FIGS. 11A to 11D, for example, when an impedance becomes a given threshold value $Z_{th}$, a cutoff frequency on a low frequency side is referred to as $f_{CL1}$, and when an impedance becomes a given threshold value $Z_{th}$, a cutoff frequency on a high frequency side is referred to as $f_{CH1}$. In addition, as illustrated in FIG. 11B, if the first decoupling circuit 130 is designed such that the first drive frequency $f_{d1}$ is included in the frequency band between $f_{CL1}$ and $f_{CH1}$, components of the first drive frequency $f_{d1}$ can be bypassed to a ground. Thereby, it is possible to prevent the components of the drive frequency from being inputted to other physical quantity sensor and the power supply line. In addition, by using two capacitors with capacitances different from each other, a cutoff frequency band can be widened from $f_{CL1}$ to $f_{CH1}$, compared to a circuit which uses only one capacitor. That is, a cutoff frequency bandwidth BWb1 of FIG. 11B can be widened more than a cutoff frequency bandwidth BW1 of FIG. 11C and a cutoff frequency bandwidth BW2 of FIG. 11D. The content described by using FIGS. 11B to 11D can also be described with respect to the second decoupling circuit 140 in the same manner as above.

Figure 12A:
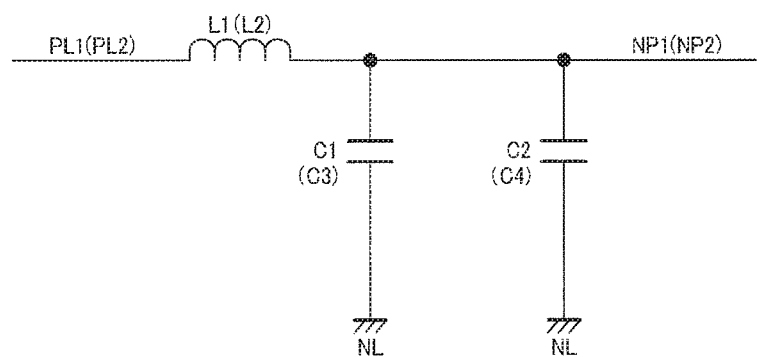
FIGS. 12A and 12B are other specific configuration examples of the decoupling circuit.

Next, FIG. 12A illustrates another specific configuration of the decoupling circuit. As illustrated in FIG. 12A, the first decoupling circuit 130 includes a first inductor L1, the first capacitor C1, and the second capacitor C2 with a capacitance different from that of the first capacitor C1.

At this time, the first capacitor C1 and the second capacitor C2 are provided between a first power supplying node NP1 which supplies power to the first physical quantity sensor 110, and a power supply node NL on a low potential side. In addition, the first inductor L1 is provided between the first power supply line PL1 and the first power supplying node NP1. More specifically, one terminal of the first capacitor C1 is connected to the first power supplying node NP1, and the other terminal thereof is connected to the power supply node NL on the low potential side. In the same manner, one terminal of the second capacitor C2 is also connected to the first power supplying node NP1, and the other terminal thereof is connected to the power supply node NL on the low potential side. In addition, one terminal of the first inductor L1 is connected to the first power supply line PL1, and the other terminal thereof is connected to the first power supplying node NP1.

In addition, the second decoupling circuit 140 can also be configured in the same manner as in FIG. 12A. That is, in this case, the second decoupling circuit 140 includes a second inductor L2, a third capacitor C3, and a fourth capacitor C4 with a capacitance value different from that of the third capacitor C3, as illustrated in FIG. 12A.

At this time, the third capacitor C3 and the fourth capacitor C4 are provided between a second power supplying node NP2 which supplies power to the second physical quantity sensor 120, and the power supply node NL on the low potential side. In addition, the second inductor L2 is provided between the second power supply line PL2 and the second power supplying node NP2. More specifically, one terminal of the third capacitor C3 is connected to the second power supplying node NP2, and the other terminal thereof is connected to the power supply node NL on the low potential side. In the same manner, one terminal of the fourth capacitor C4 is also connected to the second power supplying node NP2, and the other terminal thereof is connected to the power supply node NL on the low potential side. In addition, one terminal of the second inductor L2 is connected to the second power supply line PL2, and the other terminal thereof is connected to the second power supplying node NP2.

Figure 12B:
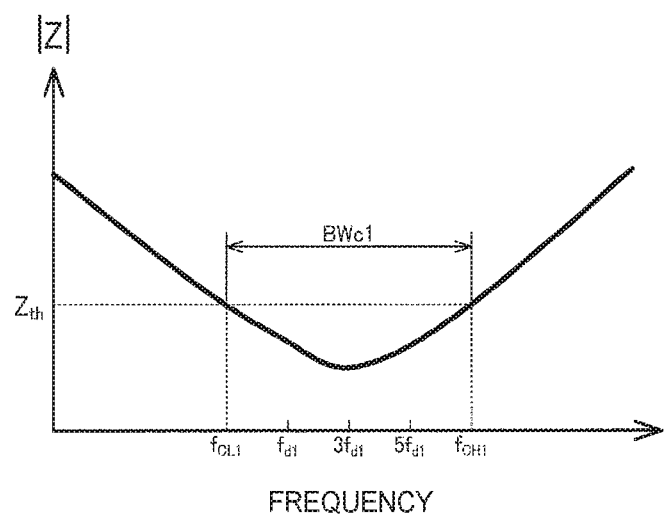

The impedance of the decoupling circuit illustrated in FIG. 12A has frequency characteristics illustrated in FIG. 12B. In a graph of FIG. 12B, a vertical axis denotes impedance |Z|, and a horizontal axis denotes a frequency. As described in the present example, if the first inductor L1 is added to the first decoupling circuit 130 illustrated in FIG. 11A, an attenuation rate (tilt of the graph) of the impedance |Z| can increase, as illustrated in FIG. 12B. Thereby, a cutoff frequency bandwidth BWc1 between $f_{CL1}$ and $f_{CH1}$ in which the impedance |Z| is less than the given threshold value $Z_{th}$ can be widened more than the cutoff frequency bandwidth BWb1 illustrated in FIG. 11B. As a result, as illustrated in FIG. 12B, the cutoff frequency $f_{CL1}$ on the low frequency side is designed to be close to the first drive frequency $f_{d1}$, and harmonics ($3f_{d1}$, $5f_{d1}$ and the like) of the first drive frequency $f_{d1}$ can also be bypassed to a ground. That is, the cutoff frequency bandwidth can be widened, compared to the decoupling circuit of FIG. 11A, and thus, it is possible to prevent the components of the drive frequency and the components of harmonics of the drive frequency from being inputted into other physical quantity sensor and the power supply line. The content described by using FIG. 12B can also be described with respect to the second decoupling circuit 140 in the same manner as described above.

Figure 13A:
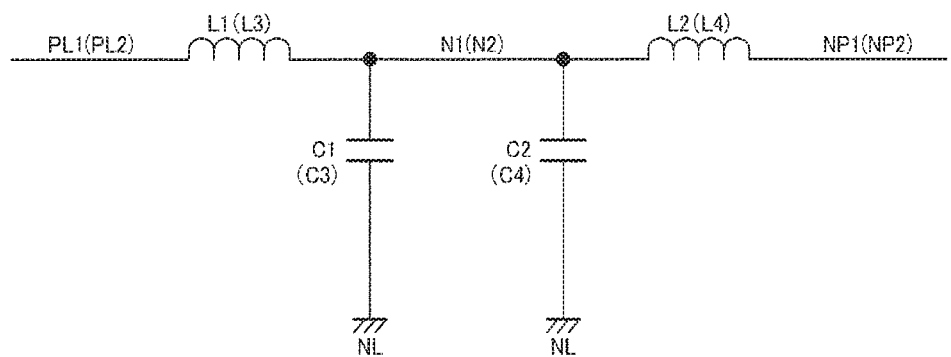
FIGS. 13A and 13B are the other specific configuration examples of the decoupling circuit.

Furthermore, FIG. 13A illustrates the other specific configuration of the decoupling circuit. As illustrated in FIG. 13A, the first decoupling circuit 130 includes the first inductor L1, the second inductor L2, the first capacitor C1, and the second capacitor C2 with a capacitance different from that of the first capacitor C1.

At this time, the first capacitor C1 and the second capacitor C2 are provided between a first node N1, and a power supply node NL on a low potential side. In addition, the first inductor L1 is provided between the first power supply line PL1 and the first node N1, and the second inductor L2 is provided between the first node N1 and the first power supplying node NP1 which supplies power to the first physical quantity sensor 110. The first node N1 is provided between the first inductor L1 and the second inductor L2, as illustrate in FIG. 13A.

In addition, the second decoupling circuit 140 can also be configured in the same manner as in FIG. 13A. That is, in this case, the second decoupling circuit 140 includes a third inductor L3, a fourth inductor L4, a third capacitor C3, and a fourth capacitor C4 with a capacitance value different from that of the third capacitor C3, as illustrated in FIG. 13A.

At this time, the third capacitor C3 and the fourth capacitor C4 are provided between a second node N2 and the power supply node NL on the low potential side. In addition, the third inductor L3 is provided between the second power supply line PL2 and the second node N2, and the fourth inductor L4 is provided between the second node N2 and the second power supplying node NP2 which supplies power to the second physical quantity sensor 120. The second node N2 is provided between the third inductor L3 and the fourth inductor L4, as illustrated in FIG. 13A.

Figure 13B:
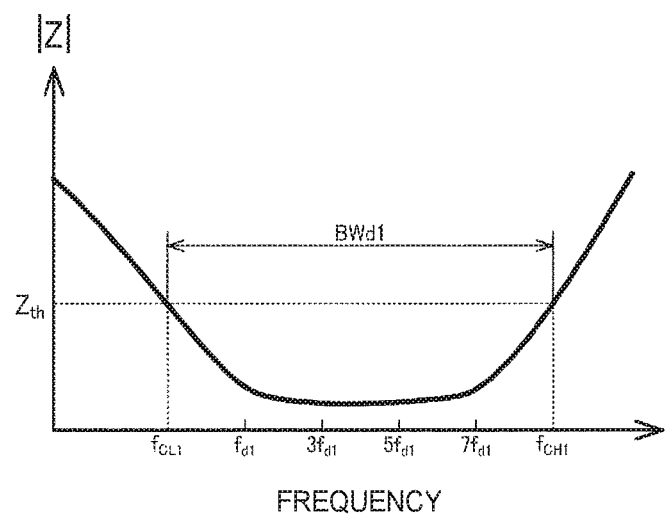

The impedance of the decoupling circuit illustrated in FIG. 13A has frequency characteristics illustrated in FIG. 13B. In a graph of FIG. 13B, a vertical axis denotes impedance |Z|, and a horizontal axis denotes a frequency. As described in the present example, if the second inductor L2 is further added to the first decoupling circuit 130 illustrated in FIG. 12A, an attenuation rate (tilt of the graph) of the impedance |Z| can increase, as illustrated in FIG. 13B. Thereby, a cutoff frequency bandwidth BWd1 between $f_{CL1}$ and $f_{CH1}$ in which the impedance |Z| is less than the given threshold value $Z_{th}$ can be widened more than the cutoff frequency bandwidth BWc1 illustrated in FIG. 12B. As a result, as illustrated in FIG. 13B, the cutoff frequency $f_{CL1}$ on the low frequency side is designed to be close to the first drive frequency $f_{d1}$, and harmonics ($3f_{d1}$, $5f_{d1}$, $7f_{d1}$, and the like) of the first drive frequency $f_{d1}$ can also be bypassed to the ground. That is, the cutoff frequency bandwidth can be further widened, compared to the decoupling circuit of FIG. 12A, and thus, it is possible to prevent the components of the drive frequency and the components of harmonics of the drive frequency from being inputted into other physical quantity sensor and the power supply line. The content described by using FIG. 13B can also be described with respect to the second decoupling circuit 140 in the same manner as described above.

In addition, the configuration illustrated in FIG. 11A to FIG. 13B can also be applied to the third decoupling circuit 150 illustrated in FIG. 1. The configuration of the decoupling circuit according to the present embodiment is not limited to the configuration illustrated in FIG. 11A to FIG. 13B. For example, it is also possible to make modifications, such as connections of other elements between the circuit elements illustrated in FIG. 11A to FIG. 13B.

Figure 14:
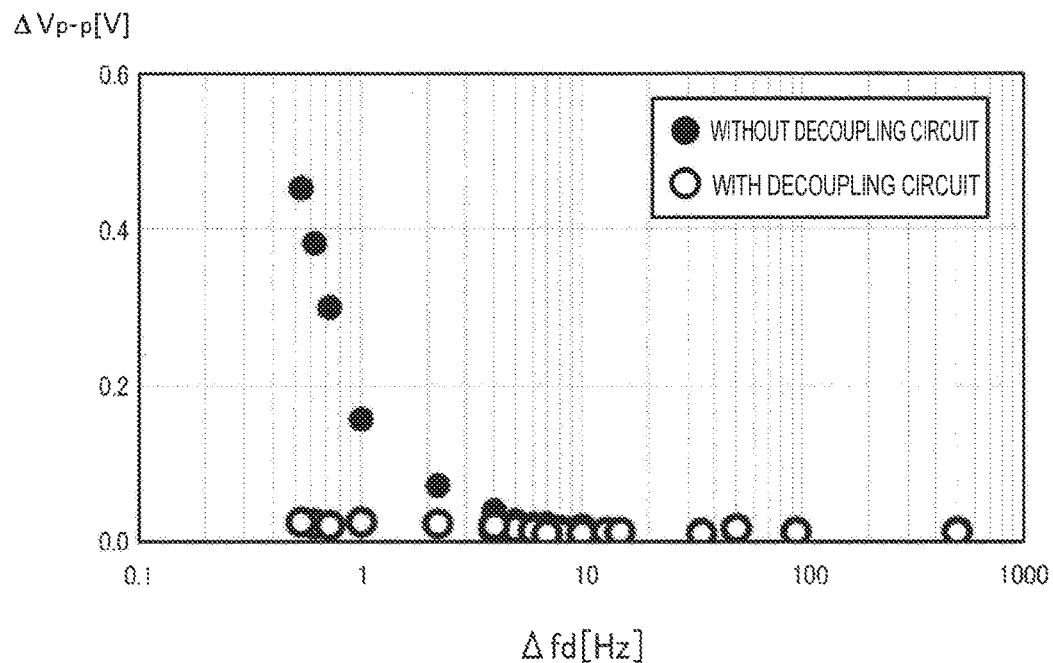
FIG. 14 is an explanatory diagram of frequency characteristics of the peak-to-peak difference amount of an output variation amount of the output signal of the sensor according to whether or not there is the decoupling circuit.

The peak-to-peak difference amount $\Delta V_{p-p}$ of the output variation amount of the output signal of the sensor at the time of using the aforementioned decoupling circuit is illustrated in a graph of FIG. 14. In the graph of FIG. 14, a vertical axis denotes the peak-to-peak difference amount $\Delta V_{p-p}$ [V] of the output variation amount $\Delta V$out of the output signal of the sensor, and a horizontal axis denotes a drive frequency difference $\Delta f d$ [Hz]. In addition, a black circle is data in a case where the decoupling circuit is not used, and a white circle is data in a case where the decoupling circuit is used.

As illustrated in FIG. 14, the peak-to-peak difference amount $\Delta V_{p-p}$ of the output variation of the output signal of the sensor can be reduced by using the decoupling circuit illustrated in FIG. 11A, FIG. 12A, FIG. 13A, or the like, without depending upon the drive frequency difference Δfd. Particularly, in a case where the decoupling circuit is not used, the peak-to-peak difference amount $\Delta V_{p-p}$ of the output variation of the output signal of the sensor increases in a bandwidth in which the drive frequency difference Δfd is equal to or less than 10 Hz. In contrast to this, in a case where the decoupling circuit is used, the peak-to-peak difference amount $\Delta V_{p-p}$ of the output variation can be reduced until being close to zero, similary in the case where the drive frequency difference Δfd is in the bandwidth equal to or higher than 10 Hz, even in the bandwidth in which the drive frequency difference Δfd is equal to or less than 10 Hz. In this case, it is possible to obtain the output signal of the sensor illustrated in FIG. 6A.

The aforementioned embodiment illustrates the decoupling circuit in a case where two physical quantity sensors are disposed on the same substrate to which the same power supply voltage is supplied, however, the same implementation can be made even in a case where three physical quantity sensors are disposed in order to detect physical quantities in directions of three axes. In addition, even in a case where the angular rate sensor and the acceleration sensor are respectively provided in the directions of three axes and a total of six physical quantity sensors are disposed, the same implementation can be made.

3. Gyro Sensor

Figure 15:
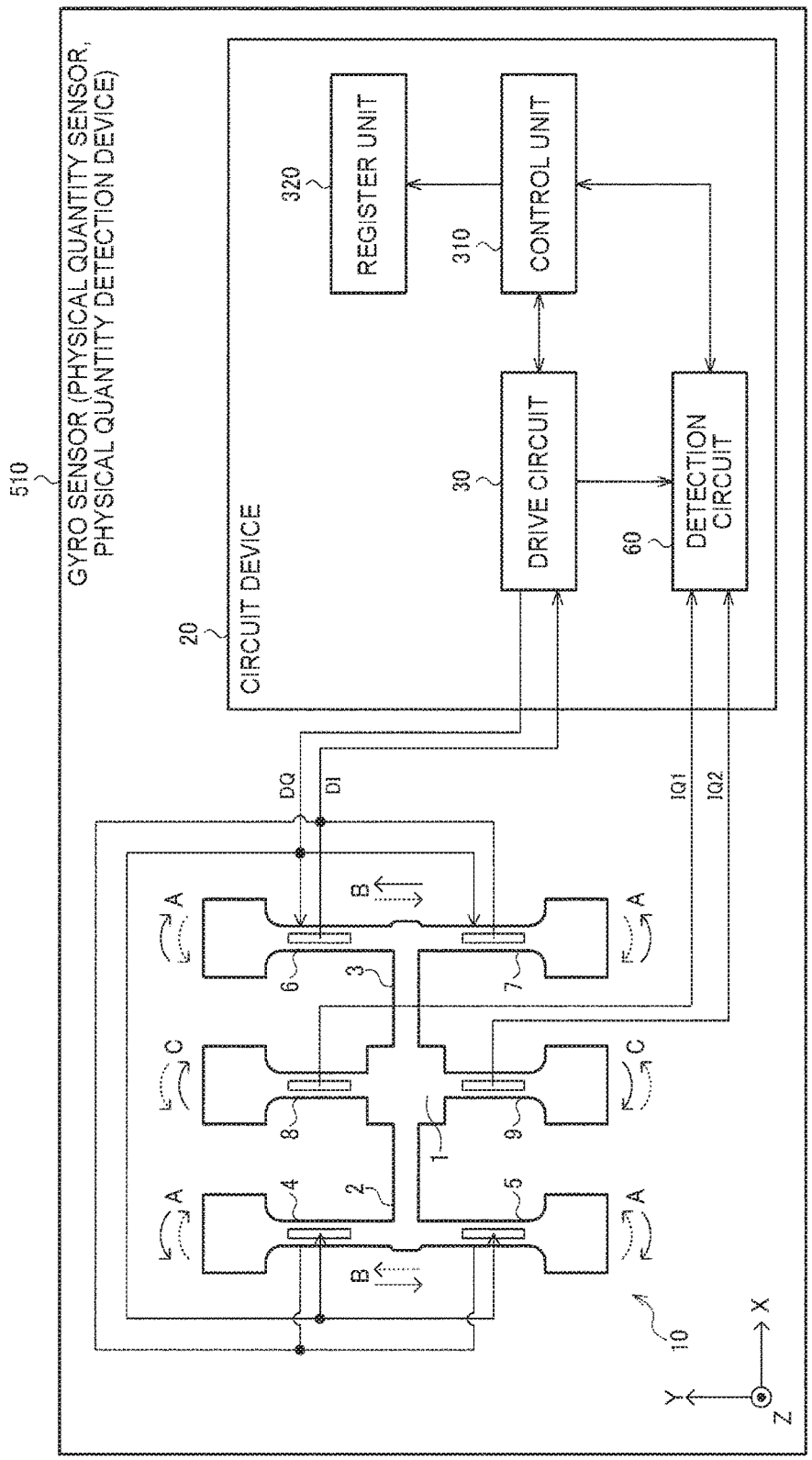
FIG. 15 is a detailed configuration example of a gyro sensor.

Next, FIG. 15 illustrates a detailed configuration example of a gyro sensor 510 (physical quantity sensor or physical quantity detection device in a broad sense) included in the physical quantity detection system 100 according to the present embodiment. The gyro sensor 510 of FIG. 15 can be applied to the first physical quantity sensor 110 and the second physical quantity sensor 120 which are described by using FIG. 2.

The gyro sensor 510 includes a vibrator element 10 and a circuit device 20. The vibrator element 10 (physical quantity transducer or angular rate sensor element in a broad sense) is a piezoelectric vibrator element which is formed of a thin plate of a piezoelectric material such as quartz. Specifically, the vibrator element 10 is a double T-shaped vibrator element which is formed of a Z-cut quartz substrate. In addition, hereinafter, a case where a physical quantity transducer (angular rate sensor element) is a piezoelectric vibrator element (vibrating gyro) and a sensor is a gyro sensor will be described as an example, but the invention is not limited to this. For example, the invention can be applied to a vibrating gyro of a capacitance detection type which is formed of a silicon substrate or the like, a physical quantity transducer which detects a physical quantity that is equivalent to angular rate information or a physical quantity other than the angular rate information, or the like.

In addition, the circuit device 20 includes a drive circuit 30, a detection circuit 60, a control unit 310, and a register unit 320. Various modifications, such as omission of a part of the configuration elements or addition of other configuration elements can be made.

The drive circuit 30 outputs a drive signal DQ, thereby driving the vibrator element 10. For example, the drive circuit receives a feedback signal DI from the vibrator element 10, and outputs the drive signal DQ corresponding to the feedback signal, thereby vibrating the vibrator element 10. In addition, the detection circuit 60 receives detection signals IQ1 and IQ2 (detection currents or electric charges) from the vibrator element 10 which is driven by the drive signal DQ, and detects (extracts) a desired signal (Coriolis force signal) according to a physical quantity which is applied to the vibrator element 10, from the detection signals IQ1 and IQ2.

The vibrator element 10 includes a substrate 1, connection arms 2 and 3, drive arms 4, 5, 6, and 7, and detection arms 8 and 9. As illustrated in FIG. 15, the detection arms 8 and 9 are respectively extended in +Y direction and −Y direction with respect to the substrate 1 of a rectangular shape. In addition, the connection arms 2 and 3 are respectively extended in +X direction and −X direction with respect to the substrate 1. In addition, the drive arms 4 and 5 are respectively extended in +Y direction and −Y direction with respect to the connection arm 2, and the drive arms 6 and 7 are respectively extended in +Y direction and −Y direction with respect to the connection arm 3. An X axis, a Y axis, and a Z axis illustrated in FIG. 15 indicate axes in vibration directions.

The drive signal DQ from the drive circuit 30 is inputted to drive electrodes provided on upper surfaces of the drive arms 4 and 5 and drive electrodes provided on side surfaces of the drive arms 6 and 7. In addition, signals from drive electrodes provided on side surfaces of the drive arms 4 and 5 and drive electrodes provided on upper surfaces of the drive arms 6 and 7 are inputted to the drive circuit 30 as the feedback signal DI. In addition, signals from detection electrodes provided on upper surfaces of the detection arms 8 and 9 are inputted to the detection circuit 60 as the detection signals IQ1 and IQ2. A common electrode provided on side surfaces of the detection arms 8 and 9 is, for example, grounded.

If the drive signal DQ of an AC is applied by the drive circuit 30, the drive arms 4, 5, 6, and 7 perform a flexural vibration (excitation vibration) denoted by an arrow A according to an inverse piezoelectric effect. That is, a flexural vibration is performed in which tips of the drive arms 4 and 6 repeat approaching and separating from each other, and tips of the drive arms 5 and 7 repeat approaching and separating from each other. At this time, the drive arms 4 and 5 and the drive arms 6 and 7 perform vibration of line symmetry with respect to the Y axis which passes through a gravity center position of the substrate 1, and thus, the substrate 1, the connection arms 2 and 3, and the detection arms 8 and 9 hardly vibrate.

In this state, if an angular rate is applied by using the Z axis as a rotation axis with respect to the vibrator element 10 (if the vibrator element 10 rotates at the Z axis), the drive arms 4, 5, 6, and 7 vibrate by Coriolis force as denoted by an arrow B. That is, the Coriolis force in a direction of the arrow B orthogonal to a direction of the arrow A and a direction of the Z axis acts on the drive arms 4, 5, 6, and 7, and thus, vibration components in the direction of the arrow B are generated. The vibration of the arrow B is transferred to the substrate 1 through the connection arms 2 and 3, and the detection arms 8 and 9 perform the flexural vibration in a direction of an arrow C. Electric charge signals which are generated by a piezoelectric effect according to the flexural vibration of the detection arms 8 and 9 are inputted to the detection circuit 60 as the detection signals IQ1 and IQ2. Here, the vibration of the arrow B of the drive arms 4, 5, 6, and 7 is vibration in a circumferential direction with respect to a gravity center position of the substrate 1, and the vibration of the detection arms 8 and 9 is vibration in the direction of the arrow C which is opposite to the direction of the arrow B in the circumferential direction. Accordingly, the detection signals IQ1 and IQ2 become signals which are shifted by 90 degrees with respect to the drive signal DQ.

For example, if an angular rate of the vibrator element 10 (gyro sensor) around the Z axis is referred to as ω, a mass is referred to m, and a vibration speed is referred to as v, the Coriolis force is expressed by Fc=2 m·v·ω. Hence, as the detection circuit 60 detects a desired signal which is a signal according to the Coriolis force, the angular rate ω can be obtained.

In addition, the control unit 310 performs control processing of the circuit device 20. The control unit 310 can be configured with a logic circuit (gate array or the like), a processor, or the like. Various switch controls, mode setting, or the like of the circuit device 20 are performed by the control unit 310. In FIG. 15, a case where the vibrator element 10 has a double T shape is illustrated as an example, but the vibrator element 10 according to the present embodiment is not limited to this configuration. For example, the vibrator element may have a tuning fork type, an H type, or the like. In addition, a piezoelectric material of the vibrator element 10 may be a material such as ceramics or silicon other than quartz.

4. Detailed Configuration of Circuit Device

Figure 16:
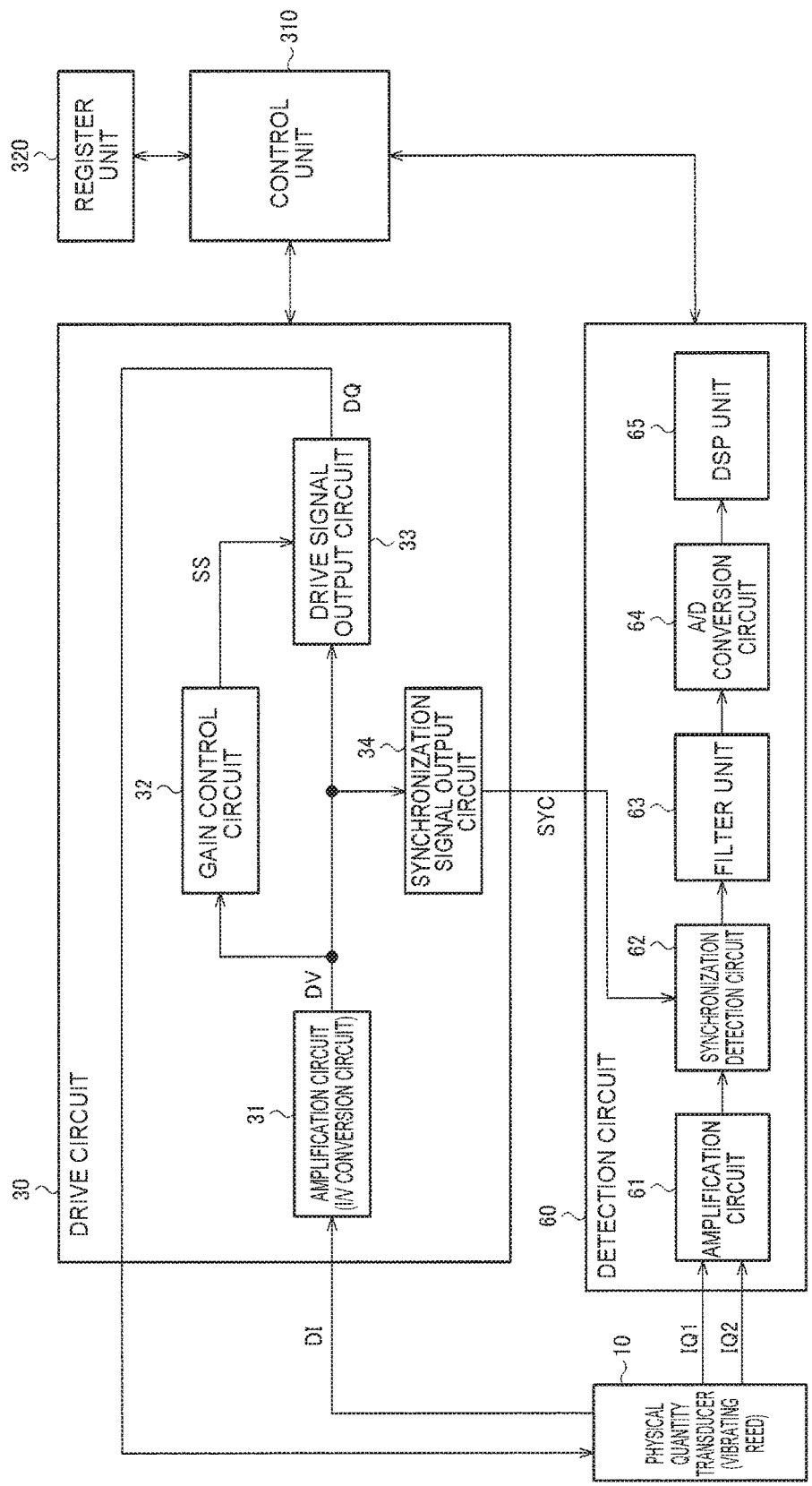
FIG. 16 is a detailed configuration example of a drive circuit and a detection circuit of a circuit device.

Next, FIG. 16 illustrates a detailed configuration example of the drive circuit 30 and the detection circuit 60 of the circuit device 20.

The drive circuit 30 includes an amplification circuit 31 which receives the feedback signal DI from the vibrator element 10, a gain control circuit 32 which performs automatic gain control, and a drive signal output circuit 33 which outputs the drive signal DQ to the vibrator element 10. In addition, the drive circuit further includes a synchronization signal output circuit 34 which outputs a synchronization signal SYC to the detection circuit 60.

The amplification circuit 31 (I/V conversion circuit) amplifies the feedback signal DI from the vibrator element 10. For example, the amplification circuit converts the feedback signal DI of a current from the vibrator element 10 into a signal DV of a voltage and outputs the converted signal. The amplification circuit 31 can be configured by an operational amplifier, a feedback resistance element, a feedback capacitor, and the like.

The drive signal output circuit 33 outputs the drive signal DQ, based on the signal DV which is amplified by the amplification circuit 31. For example, in a case where the drive signal output circuit 33 outputs a drive signal of a rectangular wave (or sinusoidal wave), the drive signal output circuit 33 can be configured by a comparator or the like.

The gain control circuit 32 (AGC) outputs a control voltage SS to the drive signal output circuit 33, thereby controlling an amplitude of the drive signal DQ. Specifically, the gain control circuit 32 monitors the signal DV and controls a gain of an oscillation loop. For example, the drive circuit 30 needs to maintain a constant amplitude of a drive voltage which is supplied to the vibrator element 10 (vibrator element for drive), so as to maintain constant sensitivity of a gyro sensor. Accordingly, the gain control circuit 32 is provided to automatically adjust again in an oscillation loop of a drive vibration system. The gain control circuit 32 variably performs automatic adjustment of a gain such that an amplitude (vibration speed v of the vibrator element) of the feedback signal DI from the vibrator element 10 is constant. The gain control circuit 32 can be configured by a full-wave rectifier which performs a full-wave rectification of the output signal DV of the amplification circuit 31, an integrator which integrates an output signal of the full-wave rectifier, and the like.

In addition, the synchronization signal output circuit 34 receives the signal DV which is amplified by the amplification circuit 31, and outputs the synchronization signal SYC (reference signal) to the detection circuit 60. The synchronization signal output circuit 34 can be configured by a comparator which generates the synchronization signal SYC of a rectangular wave by binarizing the signal DV of a sinusoidal wave (alternate current), a phase adjustment circuit (phase shifter) which performs phase adjustment of the synchronization signal SYC, and the like.

In addition, while not illustrated in FIG. 16, a clock signal generation circuit generating a clock signal MCK which is a master clock of an A/D conversion circuit 64, a DSP unit 65, the control unit 310, or the like is provided in the circuit device 20. The clock signal generation circuit generates the clock signal MCK using, for example, a CR oscillation circuit or the like, but the present embodiment is not limited to this.

Next, the detection circuit 60 includes an amplification circuit 61, a synchronization detection circuit 62, the filter unit 63, the A/D conversion circuit 64, and the DSP unit 65.

The amplification circuit 61 receives first and second detection signals IQ1 and IQ2 from the vibrator element 10, and performs electric charges-voltage conversion, amplification of differential signals, gain adjustment, or the like. The synchronization detection circuit 62 performs synchronization detection, based on the synchronization signal SYC from the drive circuit 30. The filter unit 63 (low pass filter) functions as a pre-filter of the A/D conversion circuit 64. In addition, the filter unit 63 also functions as a circuit which attenuates an unnecessary signal that is not removed by the synchronization detection. The A/D conversion circuit 64 performs A/D conversion of a signal whose synchronization detection is completed. The DSP unit 65 performs digital signal processing, such as digital filter processing or digital correction processing with respect to a digital signal from the A/D conversion circuit 64. The digital correction processing includes, for example, a zero point correction processing, sensitivity correction processing, and the like. For example, the detection signals IQ1 and IQ2 which are electric charge signals (current signals) from the vibrator element 10 have a phase lagged by 90 degrees behind the drive signal DQ which is a voltage signal. Furthermore, a Q/V conversion circuit or the like of the amplification circuit 61 has a phase lagged by 90 degrees. Accordingly, an output signal of the amplification circuit 61 has a phase lagged by 180 degrees behind the drive signal DQ. Thus, it is possible to remove an unnecessary signal having a phase lagged by 90 degrees behind the drive signal DQ by performing synchronization detection, using the synchronization signal SYC having the same phase as the drive signal DQ (DV).

Configurations of the drive circuit 30 and the detection circuit 60 are not limited to the configuration illustrated in FIG. 16, and various modifications, such as omission of partial configuration elements thereof or addition of other configuration elements can be made.

5. Electronic Apparatus and Moving Object

Figure 17:
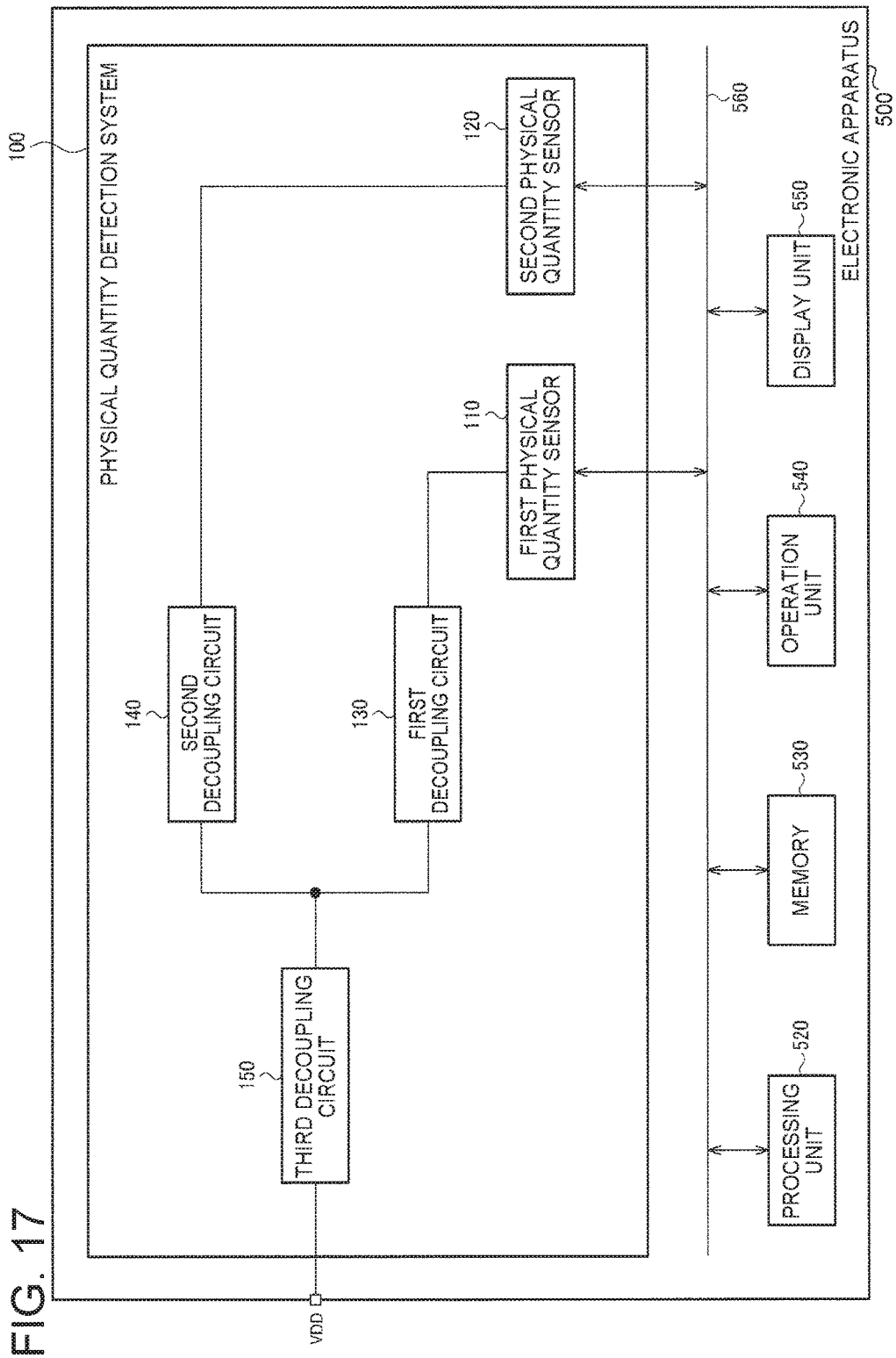
FIG. 17 is a detailed configuration example of an electronic apparatus or a moving object including a physical quantity detection system.

Next, a detailed configuration example of an electronic apparatus 500 or a moving object which includes the physical quantity detection system 100 according to the present embodiment is illustrated in FIG. 17.

The electronic apparatus 500 includes the physical quantity detection system 100 and a processing unit 520. In addition, the electronic apparatus 500 can include a memory 530, an operation unit 540, and a display unit 550. The processing unit 520 (external processing device) which is configured by a CPU, an MPU, or the like performs control of the physical quantity detection system 100 or the like, or the entire control of the electronic apparatus 500. In addition, the processing unit 520 performs processing, based on angular rate information (physical quantity in a broad sense) which is detected by the physical quantity detection system 100. For example, the processing unit 520 performs processing for image stabilization, postural control, GPS autonomous navigation, or the like, based on the acquired angular rate information. In addition, the memory 530 (ROM, RAM, or the like) stores a control program or various data, or functions as a work area or a data storage area. The operation unit 540 is used for a user to operate the electronic apparatus 500, and the display unit 550 displays various type of information for a user.

The electronic apparatus 500 and the moving object are not limited to the configuration illustrated in FIG. 17, and various modifications, such as omission of partial configuration elements thereof or addition of other configuration elements can be made. In addition, various apparatuses, such as, a digital camera, a video camera, a smartphone, a cellular phone, a car navigation system, a robot, a living body information detection device, a game machine, a clock, a health appliance, or a portable information terminal can be used as the electronic apparatus 500 according to the present embodiment.

Figure 18A:
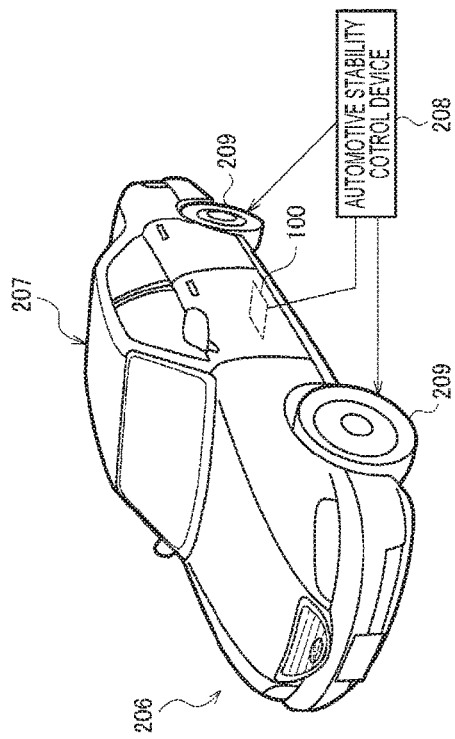
FIGS. 18A to 18D are specific examples of the electronic apparatus and the moving object.

Next, FIG. 18A illustrates an example of a moving object including the physical quantity detection system 100 according to the present embodiment. The physical quantity detection system 100 according to the present embodiment can be employed in various moving objects, such as, a vehicle, an airplane, a motorcycle, a bicycle, or a ship. The moving object includes, for example, a drive mechanism such as an engine or a motor, a steering mechanism such as a handle or a rudder, and various electronic apparatuses, and is an apparatus or a device which moves the ground, the sky, or the sea. FIG. 18A schematically illustrates an automobile 206 as a specific example of the moving object. The automobile 206 employs the physical quantity detection system 100 including the gyro sensor 510 (sensor). The gyro sensor 510 can detect a posture of a car body 207. A detection signal of the gyro sensor 510 is supplied to an automotive stability control device 208. The automotive stability control device 208 can control, for example, harness of suspension according to a posture of the car body 207, or can control a brake of each wheel 209. In addition to this, the postural control can be used for various moving objects, such as, a bipedal walking robot, an airplane, or a helicopter. The physical quantity detection system 100 can be employed in realizing the postural control.

Figure 18B:
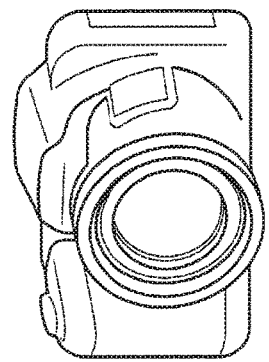
Figure 18C:
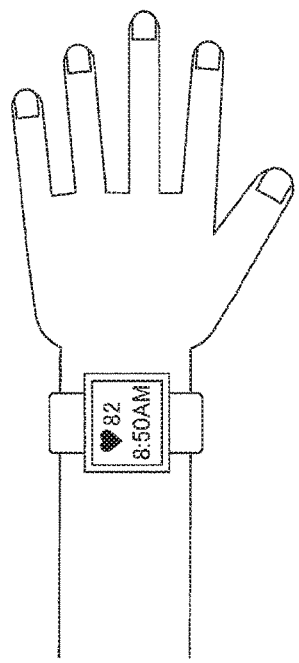

As illustrated in FIGS. 18B and 18C, the physical quantity detection system 100 according to the present embodiment can be applied to various electronic apparatuses, such as, a digital still camera or a living body information detection device (wearable health machine, for example, a pulsimeter, a pedometer, an activity meter, or the like). For example, the physical quantity detection system can perform image stabilization or the like which uses a gyro sensor or an acceleration sensor in a digital still camera. In addition, the living body information detection device can detect body motion of a user or a state of motion, using a gyro sensor or an acceleration sensor.

Figure 18D:
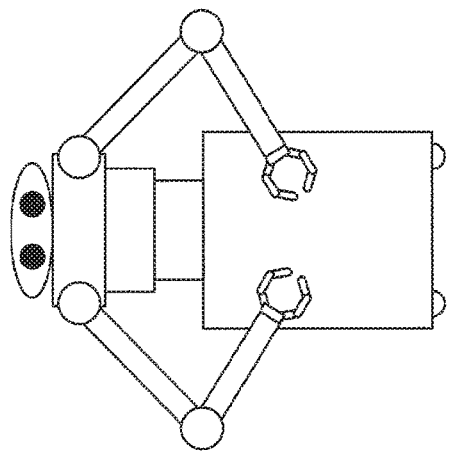

In addition, as illustrated in FIG. 18D, the physical quantity detection system 100 according to the present embodiment can also be applied to a movable unit (arm or joint) or a main body of a robot. The robot can be used for a moving object (travel or walking robot) and an electronic apparatus (non-travel or non-walking robot). In a case of the travel or walking robot, the physical quantity detection system 100 according to the present embodiment can be used for, for example, an autonomous travel.

As described above, the present embodiment is described in detail, and it can be easily understood to the skilled in the art that many modifications will be made within a range without departing from novel items and effects of the invention. Hence, such modification examples are intended to be included in a range of the invention. For example, in the specification or the drawings, one word which is described at least once in common with another word having broader or the same meaning can be replaced with a word different therefrom at a place of the specification or the drawings. In addition, the configurations of the physical quantity detection system, the electronic apparatus, and the moving object, and the structure of the vibrator element are also not limited to the description of the present embodiment, and various modifications thereof can be made.

The entire disclosure of Japanese Patent Application No. 2015-177415, filed Sep. 9, 2015 is expressly incorporated by reference herein.

What is claimed is:

1. A physical quantity detection system comprising:
a first physical quantity sensor that includes a first physical quantity transducer, a first drive circuit which drives the first physical quantity transducer, and a first detection circuit which outputs first physical quantity information corresponding to a first physical quantity, based on a first detection signal which is outputted from the first physical quantity transducer;
a second physical quantity sensor that includes a second physical quantity transducer, a second drive circuit which drives the second physical quantity transducer, and a second detection circuit which outputs second physical quantity information corresponding to a second physical quantity, based on a second detection signal which is outputted from the second physical quantity transducer;
a first power supply line to which a power supply voltage that is supplied to the first physical quantity sensor from a common power supply of the first physical quantity sensor and the second physical quantity sensor is applied;
a second power supply line to which the power supply voltage that is supplied to the second physical quantity sensor from the power supply is applied;
a first decoupling circuit which is connected to a path of the first power supply line and has a first band elimination frequency characteristic; and
a second decoupling circuit which is connected to a path of the second power supply line and has a second band elimination frequency characteristic,
wherein, in a case where a first drive frequency of the first drive circuit is referred to as $f_{d1}$, a second drive frequency of the second drive circuit is referred to as $f_{d2}$, a cutoff frequency on a low frequency side of the first band elimination frequency characteristics is referred to as $f_{CL1}$, a cutoff frequency on a low frequency side of the second band elimination frequency characteristics is referred to as $f_{CL2}$, a cutoff frequency on a high frequency side of the first band elimination frequency characteristics is referred to as $f_{CH1}$, and a cutoff frequency on a high frequency side of the second band elimination frequency characteristics is referred to as $f_{CH2}$, a relationship of $f_{CL1} < f_{d1} < f_{CH1}$ is satisfied and a relationship of $f_{CL2} < f_{d2} < f_{CH2}$ is satisfied.

2. The physical quantity detection system according to claim 1, wherein a relationship of $f_{CL1} < f_{d1} < 3 \times f_{d1} < f_{CH1}$ is satisfied and a relationship of $f_{CL2} < f_{d2} < 3 \times f_{d2} < f_{CH2}$ is satisfied.

3. The physical quantity detection system according to claim 1, wherein a relationship of $f_{CL1} < f_{d1} < 3 \times f_{d1} < 5 \times f_{d1} < 7 \times f_{d1} < f_{CH1}$ is satisfied and a relationship of $f_{CL2} < f_{d2} < 3 \times f_{d2} < 5 \times f_{d2} < 7 \times f_{d2} < f_{CH2}$ is satisfied.

4. The physical quantity detection system according to claim 1,
wherein the first drive circuit and the second drive circuit drive the first physical quantity transducer and the second physical quantity transducer using drive signals of a rectangular wave.

5. The physical quantity detection system according to claim 1,
wherein, in a case where an upper side frequency of a detection frequency band of the first physical quantity information and the second physical quantity information is referred to as $f_g$, a relationship of $|f_{d1}-f_{d2}| < f_g$ is satisfied.

6. The physical quantity detection system according to claim 1, further comprising:
a third power supply line which applies the power supply voltage to the first power supply line and the second power supply line; and
a third decoupling circuit which is connected to a path of the third power supply line.

7. The physical quantity detection system according to claim 1,
wherein the first decoupling circuit includes a first capacitor, and a second capacitor having a capacitance value different from a capacitance value of the first capacitor,
wherein the second decoupling circuit includes a third capacitor, and a fourth capacitor having a capacitance value different from a capacitance value of the third capacitor,
wherein the first capacitor and the second capacitor are provided between the first power supply line which supplies the power supply voltage on a high potential side and a power supply node on a low potential side, and
wherein the third capacitor and the fourth capacitor are provided between the second power supply line which supplies the power supply voltage on the high potential side and a power supply node on the low potential side.

8. The physical quantity detection system according to claim 1,
wherein the first decoupling circuit includes a first inductor, a first capacitor, and a second capacitor having a capacitance value different from a capacitance value of the first capacitor,
wherein the second decoupling circuit includes a second inductor, a third capacitor, and a fourth capacitor having a capacitance value different from a capacitance value of the third capacitor,
wherein the first capacitor and the second capacitor are provided between a first power supplying node which supplies the power supply voltage to the first physical quantity sensor and a power supply node on a low potential side,
wherein the first inductor is provided between the first power supply line and the first power supplying node,
wherein the third capacitor and the fourth capacitor are provided between a second power supplying node which supplies the power supply voltage to the second physical quantity sensor and a power supply node on the low potential side, and
wherein the second inductor is provided between the second power supply line and the second power supplying node.

9. The physical quantity detection system according to claim 1,
wherein the first decoupling circuit includes a first inductor, a second inductor, a first capacitor, and a second capacitor having a capacitance value different from a capacitance value of the first capacitor,
wherein the second decoupling circuit includes a third inductor, a fourth inductor, a third capacitor, and a fourth capacitor having a capacitance value different from a capacitance value of the third capacitor,
wherein the first capacitor and the second capacitor are provided between a first node and a power supply node on a low potential side,
wherein the first inductor is provided between the first power supply line and the first node,
wherein the second inductor is provided between the first node and a first power supplying node which supplies the power supply voltage to the first physical quantity sensor,
wherein the third capacitor and the fourth capacitor are provided between a second node and a power supply node on the low potential side,
wherein the third inductor is provided between the second power supply line and the second node, and
wherein the fourth inductor is provided between the second node and a second power supplying node which supplies the power supply voltage to the second physical quantity sensor.

10. The physical quantity detection system according to claim 1, wherein the first physical quantity information and the second physical quantity information is angular rate information.

11. A physical quantity detection system comprising:
a first physical quantity sensor that includes a first physical quantity transducer, a first drive circuit which drives the first physical quantity transducer, and a first detection circuit which outputs first physical quantity information corresponding to a first physical quantity, based on a first detection signal which is outputted from the first physical quantity transducer;
a second physical quantity sensor that includes a second physical quantity transducer, a second drive circuit which drives the second physical quantity transducer, and a second detection circuit which outputs second physical quantity information corresponding to a second physical quantity, based on a second detection signal which is outputted from the second physical quantity transducer;
a first power supply line to which a power supply voltage that is supplied to the first physical quantity sensor from a common power supply of the first physical quantity sensor and the second physical quantity sensor is applied;
a second power supply line to which the power supply voltage that is supplied to the second physical quantity sensor from the power supply is applied;
a third power supply line which applies the power supply voltage to the first power supply line and the second power supply line;
a first decoupling circuit which is connected to a path of the first power supply line;
a second decoupling circuit which is connected to a path of the second power supply line; and
a third decoupling circuit which is connected to a path of the third power supply line.

12. An electronic apparatus comprising:
the physical quantity detection system according to claim 1.

13. An electronic apparatus comprising:
the physical quantity detection system according to claim 2.

14. An electronic apparatus comprising:
the physical quantity detection system according to claim 3.

15. An electronic apparatus comprising:
the physical quantity detection system according to claim 4.

16. An electronic apparatus comprising:
the physical quantity detection system according to claim 5.

17. A moving object comprising:
the physical quantity detection system according to claim 1.

18. A moving object comprising
the physical quantity detection system according to claim 2.

19. A moving object comprising:
the physical quantity detection system according to claim 3.

20. A moving object comprising:
the physical quantity detection system according to claim 4.

* * * * *